(12) United States Patent
Cawley

(10) Patent No.: US 10,048,960 B2
(45) Date of Patent: Aug. 14, 2018

(54) IDENTIFYING SOURCE CODE USED TO BUILD EXECUTABLE FILES

(71) Applicant: Semmle Limited, Oxford (GB)

(72) Inventor: Peter Cawley, Oxford (GB)

(73) Assignee: Semmle Limited, Oxford (GB)

( * ) Notice: Subject to any disclaimer, the term of this patent is extended or adjusted under 35 U.S.C. 154(b) by 686 days.

(21) Appl. No.: 14/574,051

(22) Filed: Dec. 17, 2014

(65) Prior Publication Data
US 2016/0179502 A1 Jun. 23, 2016

(51) Int. Cl.
*G06F 9/44* (2018.01)
*G06F 8/70* (2018.01)
*G06F 8/54* (2018.01)
*G06F 8/77* (2018.01)
*G06F 11/36* (2006.01)

(52) U.S. Cl.
CPC .............. *G06F 8/70* (2013.01); *G06F 8/54* (2013.01); *G06F 8/77* (2013.01); *G06F 11/3624* (2013.01)

(58) Field of Classification Search
CPC .............. G06F 8/54; G06F 8/77; G06F 8/70
USPC ...................................................... 717/121
See application file for complete search history.

(56) References Cited

U.S. PATENT DOCUMENTS

| | | | | |
|---|---|---|---|---|
| 5,179,702 A * | 1/1993 | Spix | ......................... | G06F 8/41 711/E12.006 |
| 5,293,629 A * | 3/1994 | Conley | ..................... | G06F 8/75 717/114 |
| 5,560,009 A * | 9/1996 | Lenkov | ..................... | G06F 8/41 714/E11.209 |
| 5,574,898 A | 12/1996 | Leblang et al. | | |
| 5,966,539 A * | 10/1999 | Srivastava | .............. | G06F 8/433 717/147 |
| 6,282,703 B1 | 8/2001 | Meth et al. | | |

(Continued)

FOREIGN PATENT DOCUMENTS

| | | |
|---|---|---|
| CN | 101937389 | 1/2011 |
| EP | 2660668 | 11/2013 |
| WO | WO/2003/021433 | 3/2003 |

OTHER PUBLICATIONS

Office Action issued in European Application No. 15200803.3 dated Jun. 6, 2016, 5 pages.

(Continued)

*Primary Examiner* — John Chavis
(74) *Attorney, Agent, or Firm* — Fish & Richardson P.C.

(57) ABSTRACT

Methods, systems, and apparatus, including computer programs encoded on computer storage media, for identifying source code used to build executable. One of the methods includes determining that a first newly created process is a compiler, the compiler being invoked to compile a source code file; after the compiler exits, generating a first hash value of an object file generated by the compiler; generating an object artifact that identifies the source code file and includes the first hash value of contents of the object file generated by the compiler; determining that the second newly created process is a linker, the linker being invoked to generate an executable file from one or more object files; generating a link artifact that includes respective hash values of each of the one or more object files used to generate the executable file; and providing the link artifact and object artifact to a static analysis system.

34 Claims, 27 Drawing Sheets

(56) References Cited

U.S. PATENT DOCUMENTS

| | | | | |
|---|---|---|---|---|
| 6,493,871 B1* | 12/2002 | McGuire | G06F 8/65 | 717/169 |
| 6,704,928 B1* | 3/2004 | Shann | G06F 8/54 | 717/162 |
| 6,779,187 B1* | 8/2004 | Hammond | G06F 9/44521 | 719/331 |
| 6,845,412 B1* | 1/2005 | Boike | G06F 13/1652 | 710/36 |
| 7,178,137 B1* | 2/2007 | Peak | G06F 8/45 | 717/131 |
| 7,634,762 B1* | 12/2009 | Wheeler | G06F 9/44521 | 717/136 |
| 7,770,202 B2 | 8/2010 | Brumme et al. | | |
| 7,805,717 B1 | 9/2010 | Spertus et al. | | |
| 8,191,054 B2* | 5/2012 | Kilbane | G06F 12/0811 | 717/149 |
| 8,347,277 B2* | 1/2013 | Pai | G06F 9/44589 | 717/140 |
| 8,468,498 B2 | 6/2013 | Lee et al. | | |
| 8,479,178 B2 | 7/2013 | Aharoni et al. | | |
| 8,875,303 B2* | 10/2014 | Bhatia | G06F 21/10 | 707/698 |
| 8,943,024 B1* | 1/2015 | Gardner | G06F 17/30156 | 707/640 |
| 9,117,071 B2* | 8/2015 | Beretta | G06F 9/45516 | |
| 9,350,547 B2* | 5/2016 | Horne | G06F 21/16 | |
| 2007/0204165 A1* | 8/2007 | Lytle | G06F 21/64 | 713/176 |
| 2008/0091938 A1* | 4/2008 | Pedersen | G06F 21/602 | 713/153 |
| 2010/0114924 A1* | 5/2010 | Zeidman | G06F 17/30657 | 707/759 |
| 2011/0106760 A1* | 5/2011 | Corkill | G06F 17/30377 | 707/626 |
| 2011/0218973 A1* | 9/2011 | Pendlebury | G06F 17/30156 | 707/692 |
| 2011/0246966 A1 | 10/2011 | Harron, III | | |
| 2011/0289586 A1 | 11/2011 | Kc et al. | | |
| 2012/0124022 A1* | 5/2012 | Goping | G06F 19/324 | 707/705 |
| 2012/0159444 A1* | 6/2012 | Agarwal | G06F 11/3624 | 717/124 |
| 2013/0247129 A1* | 9/2013 | Heron | H04L 63/20 | 726/1 |

OTHER PUBLICATIONS

"Apache Commons BCEL—Byte Code Engineering Library", Feb. 18, 2014, retrieved from the Internet on Dec. 23, 2014 at http://commons.apache.org/proper/commons-bcel/manual.html, 17 pages.

Chapman, Ryan A., "Bypassing snoopy logging", Apr. 15, 2011, retrieved from the Internet on Dec. 23, 2014 at http://blogschapman.org/post/4921812115/bypassing-snoopy-logging, 5 pages.

De Shutter, "Automated architectural reviews with Semmle," 2012 28th IEEE International Conference on Software Maintenance (ICSM), Sep. 23, 2012, pp. 557-565, XP032299523.

European Search Report issued in European Application No. 15200803.3 dated Mar. 30, 2016, 5 pages.

* cited by examiner

IDENTIFYING SOURCE CODE USED TO BUILD EXECUTABLE FILES

BACKGROUND

This specification relates to static analysis of computer software source code.

Static analysis refers to techniques for analyzing computer software source code without executing the source code as a computer software program.

Source code in a code base is typically compiled in a build environment maintained by a build system. The build environment includes an operating system; a file system; executable files, e.g., compilers; environment variables, e.g., variables that indicate a path to file system directories that contain source code files or executable files; and other configuration files for building source code in the code base.

Many compilers have a preprocessor that runs before the compiler is called. Preprocessors can make arbitrary textual substitutions in existing source code files before the compiler is called to compile the modified source code. Preprocessors can also generate temporary source code files that are compiled but then deleted by the build system when compilation is complete.

In addition, build utilities, e.g., the "make" utility on Linux and Unix operating systems, can be programmed to copy source code files from one place to another during the build process. For example, a build utility can copy a file from one location to another for compilation because another source code file may include or depend on the copied file. The copied file may then be deleted by the build system after compilation is complete.

In these situations, merely having read access to the source code files in a file system is insufficient for a static analysis system to extract all the source code that is built by a build system.

SUMMARY

This specification describes a static analysis system that can determine exactly which source code, and possibly which object files, were used to build an executable file. This allows the static analysis system to unambiguously identify source code defining externally linked symbols in the executable file. The static analysis system can provide a runtime library that intercepts calls to compilers and linkers by a build utility, which gives the static analysis system access to exactly the source code compiled by the build system and object files used to generate executable files.

In general, one innovative aspect of the subject matter described in this specification can be embodied in methods that include the actions of receiving, by a newly created process, a request to execute code of an executable file in the newly created process, wherein the request specifies a parameter; loading, by the newly created process, a process interception library; determining, by library initialization code of the process interception library, that the parameter should be intercepted; and in response to determining that the parameter should be intercepted, providing the parameter to another process. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The library initialization code is code that executes in response to the process interception library being loaded. The actions include executing the library initialization code before executing a main routine of the executable file. The parameter is a location of a source code file, and determining that the parameter should be intercepted comprises determining that the executable file is a compiler. Providing the parameter to another process comprises providing the location of the source code file to a source code extractor. The actions include invoking, by the library initialization code, a new extractor process, wherein providing the location of the source code file to the source code extractor comprises providing the location of the source code file as a parameter to the new extractor process. The actions include determining, by the library initialization code, that a system setting specifies that the compiler should compile the source code file before the source code extractor extracts source code of the source code file; and in response to determining that the system setting specifies that the compiler should compile the source code file before the source code extractor extracts source code of the source code file, invoking, by the library initialization code, a compiler process before invoking the new extractor process, wherein the new extractor process can access output generated by the compiler process. The actions include setting a shared library environment variable, wherein the shared library environment variable causes an operating system to load the process interception library into the newly created process.

In general, another innovative aspect of the subject matter described in this specification can be embodied in methods that include the actions of receiving, by a custom create-process function that overrides a default create-process function of a parent process, a request to execute code of an executable file in a new process, wherein the request specifies a location of a source code file; determining, by the custom create-process function, that the executable file is a compiler; and in response to determining that the executable file is a compiler, providing the location of the source code file to a source code extractor. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include loading a custom process interception library into the new process. Loading the process interception library causes library initialization code of the process interception to override the default create-process function with the custom create-process function. Overriding the default create-process function in the new process with the custom create-process function comprises generating, by library initialization code of a process interception library, a modified export table entry for the default create-process function, wherein the modified export table entry for the default create-process function includes an address of the custom create-process function. The actions include invoking a new extractor process using the default create-process function, wherein providing the location of the source code file to the source code extractor comprises providing the location of the source code file as a parameter to the new extractor process. The actions include invoking a new compiler process using the default create-process function. The actions include determining that a system setting specifies that the compiler should compile the source code file before the source code extractor extracts source code of the source code file; in response to determining that the system setting specifies that the compiler should compile the source code file before the source code extractor extracts source code of the source code file, sending a first request to the extractor process to wait for the compiler process to finish; sending a second request to the compiler process to wake up the source code extractor when compilation is complete; determining, by deinitialization code of the compiler process, that the compiler process received the second request to wake up the source code extractor when compilation is complete; and sending, by the compiler process to the extractor process, a wake-up signal, wherein the wake-up signal causes the new extractor process to extract source code of the source code file.

In general, another innovative aspect of the subject matter described in this specification can be embodied in methods that include the actions of loading a process interception library in a parent process, wherein library initialization code of the process interception library overrides a default create-process function of an operating system with a custom create-process function; receiving, by the custom create-process function, a request from the parent process to create a new process; creating the new process in response to the request using the default create-process function; copying bootstrap code into the new process, wherein the bootstrap code loads the process interception library into the new process using a default library loader function; modifying the default library loader function of the new process to include an unconditional jump to the bootstrap code at a beginning of the library loader function; and executing the new process, including jumping to the bootstrap code by the unconditional jump when the library loader function is called, and loading the process interception library into the new process. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The bootstrap code restores the library loader function, and loading the process interception library into the new process comprises loading the process interception library into the new process using the restored library loader function.

In general, another innovative aspect of the subject matter described in this specification can be embodied in methods that include the actions of obtaining a process identifier of a parent process; copying bootstrap code into the parent process, wherein the bootstrap code loads a process interception library into the parent process using a default library loader function; requesting the parent process to execute a remote procedure call to an override function, wherein the override function overrides a default create-process function with a custom create-process function of the process interception library; and executing the bootstrap code in the parent process. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The bootstrap code executes the remote procedure call to the override function. The override function performs operations comprising writing a first unconditional jump to the custom create-process function at a first address in unused bytes preceding the default create-process function; and writing a second unconditional jump to the first address over initial no-op instruction bytes of the default create-process function. The default create-process function comprises an initial segment of one or more instructions and a remainder segment of one or more instructions, and wherein the override function performs operations comprising copying the initial segment of the default create-process function to a first address in the parent process; writing a first unconditional jump to a first address of the remainder segment of the default create-process function, wherein the first unconditional jump is written at an address subsequent to the copied initial segment of the default create-process function; writing a second unconditional jump to the custom create-process function at a second address that is within range of a third unconditional jump; writing a third unconditional jump to the second jump at a third address that is within range of a fourth unconditional jump; and overwriting the initial segment of the default create-process function to include a fourth unconditional jump to the third unconditional jump.

In general, another innovative aspect of the subject matter described in this specification can be embodied in methods that include the actions of receiving, by a new process, a request to execute code of an executable file in a new process, wherein the request specifies an execution environment, the request specifying one or more arguments or environment variables; modifying an argument or an environment variable specified in the request; and invoking, by library initialization code of a process interception library loaded by the new process, a second new process using the executable file and the modified argument or environment variable. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of receiving, by a custom create-process function that overrides a default create-process function of a parent process, a request to execute code of an executable file in a new process, wherein the request specifies an execution environment comprising one or more arguments or environment variables; modifying an argument or an environment variable specified in the request; and invoking, by the default create-process function, the new process using the executable file and the modified argument or environment variable. Other embodiments of this aspect include corresponding computer systems, apparatus, and computer programs recorded on one or more computer storage devices, each configured to perform the actions of the methods.

In general, another innovative aspect of the subject matter described in this specification can be embodied in a system of one or more computers and one or more storage devices storing instructions that are operable, when executed by the one or more computers, to implement components comprising an extraction utility that loads a process interception library, wherein the extraction utility invokes a build utility process using an executable file of a build utility, wherein the build utility process invokes a compiler process using an executable file of a compiler and passes a location of a source code file to the compiler process as a parameter, wherein the compiler process calls a custom create-process function defined in the process interception library that preempts a default create-process function of an operating system, and wherein the compiler process invokes a source code extractor process using the default create-process function when executing library initialization code of the process interception library, including passing the location of the source code file to the source code extractor process as a parameter.

The foregoing and other embodiments can each optionally include one or more of the following features, alone or in combination. The library initialization code is executed in the compiler process after the process interception library is loaded into the compiler process and before a main routine of the compiler process is executed.

In general, another innovative aspect of the subject matter described in this specification can be embodied in a system of one or more computers and one or more storage devices storing instructions that are operable, when executed by the one or more computers, to implement components comprising an extraction utility that loads a process interception library, wherein the extraction utility invokes a build utility process using an executable file of a build utility, wherein library initialization code of the process interception library overrides a default create-process function of the build utility process with a custom create-process function, wherein the build utility process receives, at the custom create-process function instead of the overridden default create-process function, a request to invoke a compiler process with an executable file of a compiler and a location of a source code file, and wherein the build utility process, in response to the request, invokes an extractor process by calling the default create-process function with an executable file of a source code extractor and the location of the source code file.

Particular embodiments of the subject matter described in this specification can be implemented so as to realize one or more of the following advantages. A static analysis system can extract exactly the source code that is compiled by a build system and can intercept linker calls to record source code files used to generate executable files without having to analyze, replicate, or emulate the behavior of the build system. This allows the static analysis system to unambiguously identify a symbol that is externally linked to generate an executable file. The static analysis system can intercept compiler and linker calls using a shared library without modifying, recompiling, or relinking any of the build utilities, compilers, or linkers of the build system. The shared library also has a minimal impact on the speed of the build system. Furthermore, the environment of the build system need not be modified to intercept compiler or linker calls nor do any system calls of the operating system need to be modified. The static analysis system tools can run in user process space of an operating system and can intercept compilers and linkers without having administrative privileges. Invoking the extractors or artifact generators in library initialization code that is run before the main routine of the compiler or linker is called can allow the system to safely allocate heap memory. Invoking the extractor or artifact generator in library initialization code also allows the system to load custom signal handlers.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A static analysis system can perform more correct and more comprehensive static analysis of source code when the static analysis system has access to precisely the source code that is compiled by a build system and can precisely determine the source code files and object files the build system uses to generate executable files as well as the definitions of externally linked symbols in the source code.

A static analysis system can obtain exactly the source code that is compiled by a build system and source and object files used to build executable files by intercepting requests by the build system to create new compiler and linker processes. The static analysis system can modify the build environment so that when a script or build utility of the build system creates a new process, the request is handled by a function defined in a custom library rather than by a default process creation function of the operating system. The custom library will be referred to as a "process interception library," because it includes functions that preempt default process creation functions in order to intercept requests by a build system to create new processes.

The custom create-process function receives all of the arguments and environment variables that the compiler process will use to compile source code. If the process being created is a compiler, the custom create-process function can then pass these intercepted arguments and environment variables to a source code extractor for extracting precisely the source code that the compiler is compiling. The custom create-process function can also record, in a object artifact, certain information about the source code file being compiled and the object file being generated by the compilation. For example, the object artifact can include a name and a location of the source code file as well as a hash value of an object file generated by the compiler.

If the process being created is a linker, the custom create-process function can record, in a link artifact, information about the object files being used to generate an executable file. For example, the link artifact can include the hash values of object files passed to the linker when the linker is called to generate an executable file.

Figure 1:
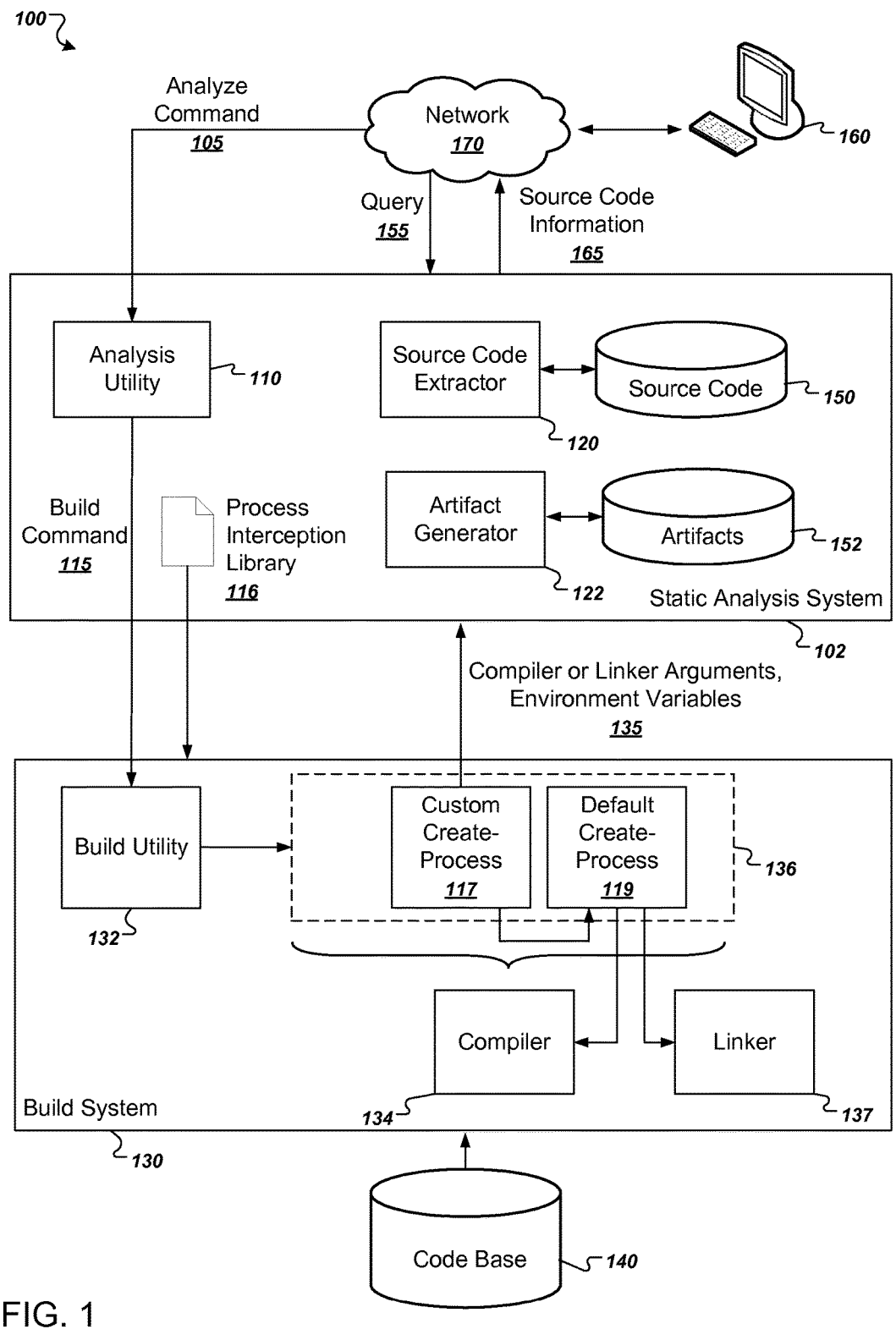
FIG. 1 illustrates an example system.

FIG. 1 illustrates an example system. The system 100 includes a user device 160 in communication with a static analysis system 102 over a network, 170, which can be any appropriate communications network. The static analysis system 102 includes an analysis utility 110, a source code extractor 120, and an artifact generator 122. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

The static analysis system 102 is in communication with a build system 130. The static analysis system 102 and the build system 130 can be installed on different computing devices that are in communication with one another, e.g., using the network 170, or the static analysis system 102 and the build system 130 can be installed on a same computing device.

The build system 130 generally builds source code in a code base 140 and generates executable files. The build system 130 includes a build utility 132, a compiler 134, and a linker 137, which can be conventional components for building and compiling source code. For example, the build utility 132 can be the "make" utility, for Linux and Unix systems, or the build utility 132 can be a batch script that coordinates compiling of source code in the code base 140.

The compiler 134 can be any appropriate compiler for compiling source code in the code base 140. For example, the compiler 134 can be the gcc compiler. (The gcc compiler is available from the Free Software Foundation, http://directory.fsf.org/wiki/Gcc.) The build system 130 may also have multiple different compilers for compiling source code in different languages of the code base 140, for compiling source code in different modes, or for compiling source code for different target architectures.

The linker 137 can be any appropriate linker for linking object files to generate an executable file. For example, the linker 137 can be Unix "ld" linker, or the gcc compiler when called as a linker. The build system 130 may also have multiple different linkers. If the build system lacks a linker, the static analysis system can still intercept calls by the build system 130 to compilers in order to extract source code that is compiled.

The static analysis system 102 provides a process interception library 116 to the build system 130. The process interception library 116 will be loaded by new processes on the build system 130 that are created during the build process.

A user of the user device 160 can provide an analyze command 105 to the analysis utility 110 of the static analysis system 102. The analyze command 105 is a request to extract precisely the source code that the compiler 134 of the build system 130 is compiling and to record information about source code files used to compile object files and object files the linker 137 uses to generate executable files.

The analysis utility 110 provides a build command 115 to the build system 130. The build command 115 causes the build system 130 to execute the build utility 132 and causes the build utility 132 to load the process interception library 116.

Loading the process interception library 116 by the build utility 132 of the build system 130 has two effects. First, every new process invoked from the build utility 132 in the build system 130 will also load the process interception library 116. Second, every new process in the build system 130 will have its default process creation functions preempted by custom process creation functions defined in the process interception library 116.

In performing a build of the code base 140, the build utility 132 will invoke the compiler 134 to compile source code files and the linker 137 to generate executable files. To do so, the build utility 132 generates a new process 136 that will execute by loading an executable file of the compiler 134 or the linker 137. The new process 136 also loads the process interception library 116, causing a default create-process function 119 of the new process 136 to be preempted by a custom create-process function 117 of the process interception library 116.

Thus, when the new process 136 calls a create-process function to load the executable file of the compiler 134 or the linker 137 into memory of the new process 136, the new process actually calls the custom create-process function 117 defined in the process interception library 116.

In general, a process is an independent execution unit that contains its own state information, uses its own address space, and only interacts with other processes by interprocess communication mechanisms, which are generally managed by an operating system. A process may include one or more threads, which are also independent execution units but which share the state information and address space of the process. A system can invoke a new process by allocating memory for the new process, loading an executable process image and one or more libraries into the memory allocated for the new process, and scheduling a new thread in the new process for execution.

In this specification, reference will be made to preempting "create-process" functions of particular operating systems. In general, the static analysis system 102 can preempt any appropriate operating system function that handles creating, initializing, modifying, or executing a new process that is being invoked. Thus, a "create-process" function need not actually allocate memory for creating a new process. For example, one appropriate default create-process function is execve on Linux, which typically loads a new process image into an existing process that was actually created by the fork command. Another appropriate default create-process function is CreateProcess on Microsoft Windows, which does allocate memory in order to invoke a new process.

In FIG. 1, the call to the custom create-process function 117 specifies the executable file of the compiler 134 or the linker 137, one or more compiler or linker arguments including one or more source code files to be compiled or object files to be linked, and one or more environment variables of the build environment. The custom create-process function 117 then passes all of these the compiler or linker arguments and environment variables 135 to the static analysis system 102.

The static analysis system 102 can then use the compiler or linker arguments and environment variables in a number of ways. For example, the static analysis system 102 can provide compiler arguments and environment variables 135 to the source code extractor 120. The source code extractor 120 can then use the compiler arguments and environment variables 135 to access precisely the source code that will be compiled by the new compiler process 136. The source code extractor 120 can store the source code in a collection of source code 150 in its original text form or in an intermediate representation. Alternatively, the source code extractor 120 can provide the source code 155 back to the user device 160 over the network 170.

When the source code extractor 120 has finished extracting the source code 155, the custom create-process function 117 resumes normal execution of the new process 136, e.g., by calling the default create-process function 119 of the build system 130 to load the executable file of the compiler 134 into the new process 136.

In some cases, the custom create-process function 117 may cause the new process 136 to run the compiler 134 before providing the source code extractor 120 with the compiler arguments and environment variables 135.

The static analysis system 102 can also provide compiler and linker arguments and environment variables 135 to an artifact generator 122. The artifact generator 122 can use the command line arguments to store, as artifacts in a collection of artifacts 152, various items of information about source code files that are compiled into object files and object files that are linked to generate executable files.

A user of the user device 160 can then provide a query 155 to request information about source code that the build system 130 used to build a particular executable file. For example, the query 155 can ask the static analysis system 102 to compute a number of lines of source code reachable from the main function of the executable file. As another example, the query 155 can request where a function used in an executable file is defined.

The static analysis system 102 can then use link artifacts stored in the collection of artifacts 152 to identify object artifacts generated from object files used to build the executable file. The static analysis system can then use the object artifacts to determine which source code files were used to compile the object files. This in turn can be used to unambiguously determine which symbol definitions were linked into the executable file.

If the source code extractor 120 extracted the source code during the build process, the static analysis system 102 can then directly access the source code used to generate the executable file, or an intermediate representation of the source code, in the collection of source code 150. The system can thus access the source code used to build the executable file regardless of what the build system 130 did with the source code files during the build process.

The static analysis system 102 can then respond to the query 155 by providing source code file information 165 about the source code files used to generate the executable file specified in the query 155. For example, the static analysis system 102 can provide the names and locations of the source code files used to build the executable file or the actual source code itself in response to the query 155.

As another example, the query 155 may request the number of lines of source code reachable from the main function an executable file. The system can then obtain the source code files used to build the executable file, compute the number of lines of code of functions reachable from main function, and return the number of lines of code in response to the query 155.

As another example, the query 155 may request information about the source code that defines the name of a function, "foo( )", called in the executable, where the function "foo( )" may have multiple definitions throughout various source code files in the system. The system can then obtain information about the source code files used to build the executable file, identify the source code defining the function "foo( )" and provide the source code defining the function "foo( )" in response to the query 155.

The custom create-process function 117 may also alter or add compiler arguments that are passed to the compiler 134 or linker 137. For example, the custom create-process function 117 could add optimization flags in the call to the default create-process function 119 in order to make the compiler compile source code with the optimizations specified by the optimization flags, even if the build system ordinarily would not have done so.

Figure 2:
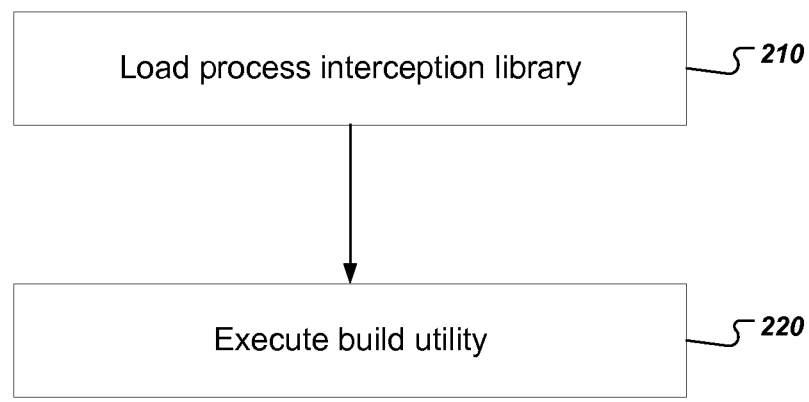
FIG. 2 is a flow chart of an example process for initiating source code extraction.

FIG. 2 is a flow chart of an example process for initiating source code extraction. In general, a static analysis system loads a process interception library and then calls a build utility of a build system. The process will be described as being performed by an appropriately programmed system of one or more computers, e.g., the extraction utility 110 described in reference to FIG. 1. The process can alternatively be performed by a user of a static analysis system. For example, a user can cause the system to perform the operations of the process by manually initiating each step of the process.

The system loads a process interception library (210). Typically, the process interception library is a shared library, sometimes referred to as a dynamically linked library. In other words, the code provided by the process interception library is loaded into memory at process load time or during process execution rather than being compiled into an executable file at compile time. By implementing the process interception library as a shared library, the static analysis system need not modify or recompile executable files of the build system.

Loading the process interception library causes a build system to execute code of a custom create-process function when a default create-process function is called. The custom create-process function will in turn cause each new child process to also load the process interception library. The procedures needed to force new processes to load the process interception library without recompiling the executable files are generally operating system-specific. Some operating systems support shared library environment variables. A shared library environment variable can specify a particular shared library that should be loaded by a new process. Thus, the system can force a new process to load the process interception library by overloading the default create-process function with a custom create-process function that ensures that a shared library environment variable includes the process interception library.

In Linux, for example, the system can set the shared library environment variable, LD_PRELOAD, which specifies one or more shared libraries that should be loaded in a new process as well as their precedence over one another. Thus, the custom create-process function can ensure that LD_PRELOAD includes the process interception library, and the new process will load the process interception library. In addition, the custom create-process function can set LD_PRELOAD to indicate that the process interception library should have precedence over other operating system libraries that may include default create-process functions.

In OS X, the system can similarly set the shared library environment variable DYLD_INSERT_LIBRARIES to include the process interception library. On OS X, the process interception library should also include an entry to the _interpose DATA section that explicitly lists overloaded create-process functions.

On Microsoft Windows, the system will generally override the functionality of a default library loader function so that when the default library loader function is called, the process also loads the process interception library. This will be described in more detail below with reference to FIGS. 5D-5E.

Loading the process interception library causes the system to preempt the default create-process function with a custom create-process function. The system can preempt the default create-process function in a number of ways.

A first technique to preempt the default create-process function is for the system to overload the default create-process function by defining a custom create-process function that has a same function name as the default create-process function and which takes precedence over the default create-process function. Thus, when a process makes a call to a function having the name of the default create-process function, the custom create-process function is called instead.

A second technique to preempt the default create-process function is for the system to provide metadata to the operating system's dynamic linker that requests that the linker replace the default create-process function with the custom create-process function.

A third technique to preempt the default create-process function is for the system to override the default create-process function by modifying information about the default create-process function. For example, the system can modify an in-memory table that specifies the starting address of the default create-process function by altering the starting address to be the starting address of the custom create-process function. Overwriting an in-memory table will be described in more detail below with reference to FIG. 5.

A fourth technique to preempt the default create-process function is for the system to also overwrite the head of the default create-process function. For example, the system can overwrite the head to include an unconditional jump instruction to the custom create-process function. Overwriting the head of the default create-process function will be described in more detail below with reference to FIGS. 8-11.

The system executes a build utility (220). The build utility can be a standard build utility of the build system, e.g., the "make" utility.

The system need not modify the build utility. Yet, after the system loads the process interception library, each new process that is created will also load the process interception library and will execute the custom create-process function whenever the default process creation function is called.

Figure 3A:
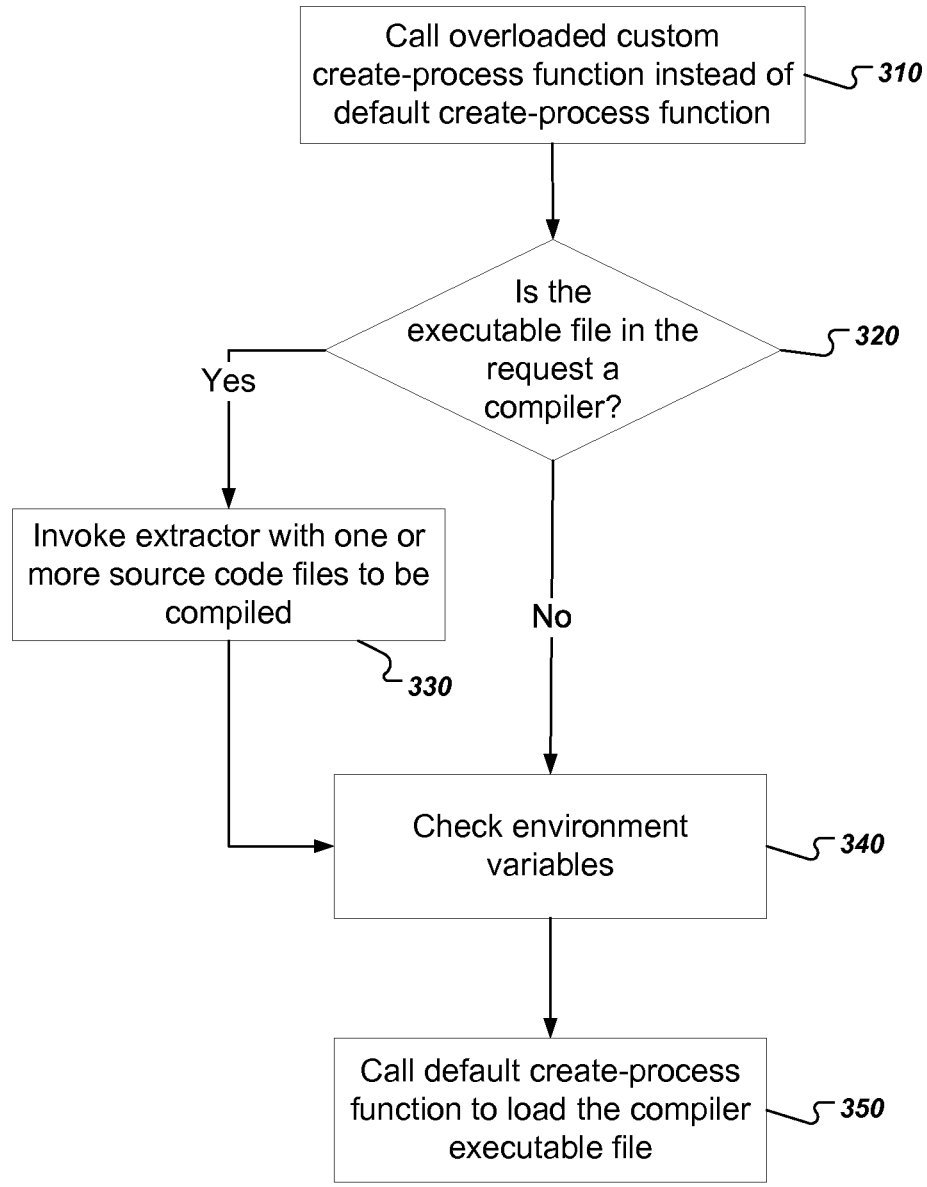
FIG. 3A is a flow chart of an example prior art process performed by a custom create-process function.

FIG. 3A is a flow chart of an example prior art process performed by a custom create-process function. The process in FIG. 3A makes use of shared library environment variables to ensure that the process interception library is loaded. The custom create-process function generally determines whether the new process is a compiler and, if so, calls a source code extractor to extract source code of the file to be compiled. The process will be described as being performed by an appropriately programmed system of one or more computers.

The system calls an overloaded custom create-process function instead of a default create-process function (310). As mentioned above, the system preempts the default create-process function so that processes execute code of a custom create-process function.

The request includes an argument that specifies the location of an executable file to execute in the new process. The request may also specify other arguments and environment variables.

In Linux and OS X systems, for example, a fork command creates a new process by making a copy of the current process. The new process then calls execve or a related process creation function. However, if the system has overloaded execve with a custom create-process function, the new process will call the custom create-process function.

The system determines whether the file is a compiler (320). The system can maintain a set of known compilers and determine whether the name or location of the file is included in the set of known compilers. The system can also maintain a set of unique file system identifiers that correspond to compiler executable files, e.g., an index node on Unix-based systems or a file identifier on Windows-based systems.

The system can also maintain a set of pattern matching rules to determine whether the file is a compiler. For example, the system can define any file that satisfies the regular expression "*\csc.exe" to be a compiler.

If the executable file in the request is a compiler, the system invokes an extractor with one or more source code files to be compiled (branch to 330). If the file is a compiler, one or more of the arguments specified in the request will specify the locations of source code files to be compiled. The locations of the source code files to be compiled can be specified directly or indirectly. For example, one of the arguments may specify the location of a file which includes a list of source code files to be compiled.

Before loading the compiler executable file into the new process, the system invokes a source code extractor on the source code files being compiled. The system can invoke the extractor by forking a new process and specifying the location of an executable file for the source code extractor as well as arguments that identify the source code files specified in the request to the compiler process. The system then waits for the source code extractor to exit before proceeding to load the compiler executable file into the compiler process.

The system checks environment variables (340). Some systems may clear or alter environment variables when creating new processes. Thus, the system ensures that the shared library environment variable is set so that other processes will also load the process interception library.

The system calls the default create-process function to load the compiler executable file (350). The system loads the compiler into the process by calling the default createprocess function, specifying the original executable file argument as well as the other arguments that specify source code files to be compiled. After setting a shared library environment variable, calling the default process creation function will also load the process interception library into the new process.

If the executable file was not a compiler, the system will simply check that the environment variables are set correctly (branch to 340), and call the default create-process function using the executable file argument (350). For example, the newly invoked extractor process will call the custom create-process function, which will determine that the executable file is not a compiler. Thus, the custom-create process function of the extractor process will call the default create-process function to load the executable file of the extractor into the extractor process. The custom create-process function can mirror the functionality of the default create-process function by providing the same arguments in the request to the default create-process function. Thus, the functionality of the custom create-process function is transparent to all new processes. However, the new processes will also load the process interception library when they ordinarily would not have.

Figure 3B:
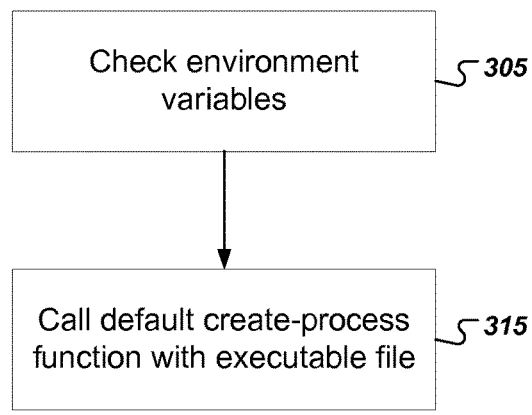
FIG. 3B is a flow chart of an example process performed by a custom create process function.

FIG. 3B is a flow chart of an example process performed by a custom create-process function. The process will be described as being performed by an appropriately programmed system of one or more computers.

In FIG. 3A, the default create-process function is called to load the compiler process image into the new process only after the source code extractor was invoked. In some implementations, the system can instead call the default create-process function to load the compiler process image before the source code extractor is invoked. In that case, the system can invoke the extractor process from within the compiler process in library initialization code, which may also be referred to as a "library constructor," and which will be described in more detail below with reference to FIG. 3C.

Invoking the extractor in library initialization code that is run before the main routine of the compiler process is called can allow the system to safely allocate heap memory as the extractor is being invoked. Invoking the extractor in library initialization code also allows the system to load custom signal handlers. This can allow the system to better handle SIGCHLD and other signals that are sent to parent processes when a child process exits.

In this example process, the custom create-process function need only check the environment variables to make sure that they are set correctly (305) and call the default process creation function (315), as described above with reference to FIG. 3A. When the shared library environment variable is set correctly, the call to the default process creation function (315) loads the process interception library into the new process.

Figure 3C:
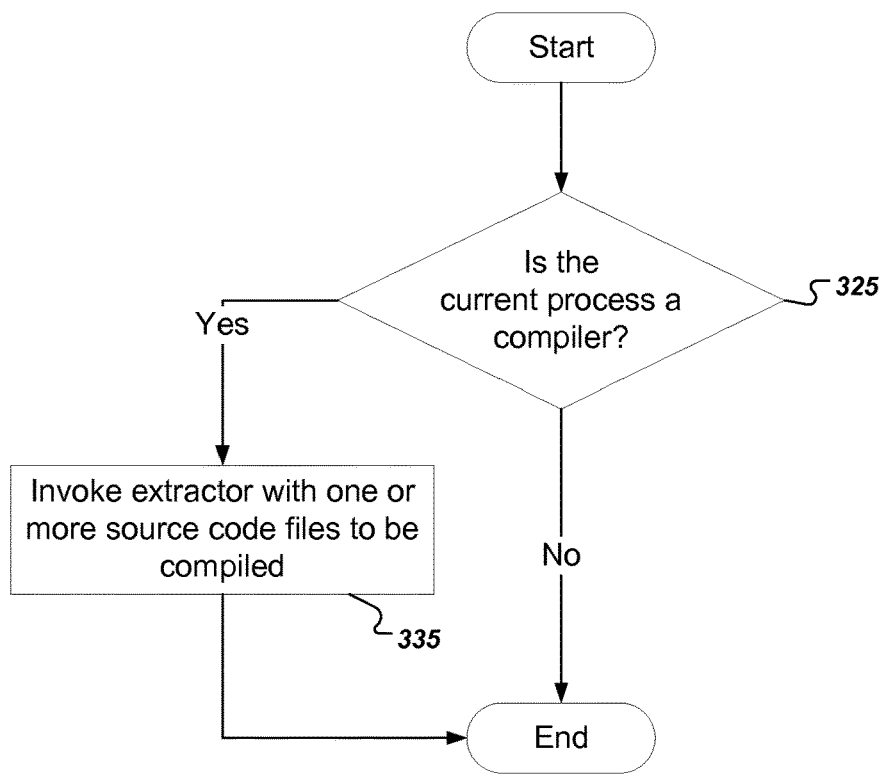
FIG. 3C is a flow chart of an example process performed by a library initialization function.

FIG. 3C is a flow chart of an example process performed by a library initialization function. The system can invoke the extractor in library initialization code of the process interception library. Library initialization code includes code that runs after a library is loaded and before the main routine of the process starts. For example, when using the "gcc" compiler and when targeting an appropriate architecture and executable file format, a particular function can be decorated with the "((constructor))" attribute, which causes its code to run just after the process interception library is loaded and before the main routine of the new process is executed.

Thus, the process in FIG. 3C can be performed in response to the new process loading the process interception library, as described above with reference to FIG. 3B. The process will be described as being performed by an appropriately programmed system of one or more computers.

The system determines whether the current process is a compiler (325). As described above, the system can determine whether the executable file occurs in a maintained list of compilers. Because the process is being performed in a library initialization function, the system can also optionally allocate heap memory, optionally set signal handlers, and, after the extractor exits, optionally deallocate heap memory and restore the signal handlers. If the current process is a compiler, the system invokes an extractor with one or more source code files to be compiled (branch to 335). The system typically also passes the compiler arguments and environment variables as well. In some implementations, the system waits for the source code extractor to exit before proceeding.

If the current process is not a compiler, the custom library initialization code ends and the newly created process proceeds normally.

Figure 3D:
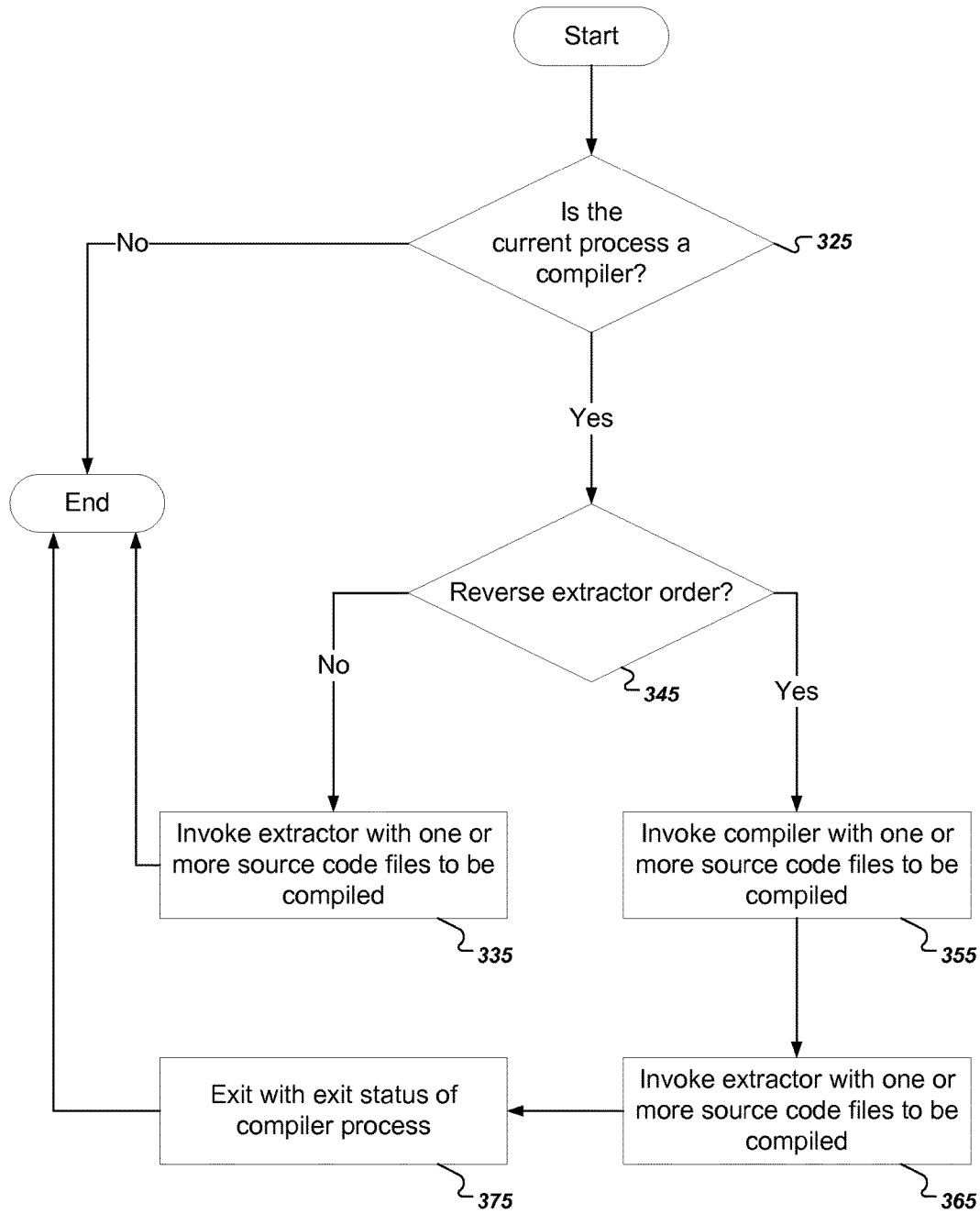
FIG. 3D is a flow chart of an example process for calling an extractor after the compiler.

FIG. 3D is a flow chart of an example process for calling an extractor after the compiler. The process in FIG. 3C illustrates the extractor being called before the compiler. On Linux and OS X systems, the system can reverse this order and call the compiler before the extractor in library initialization code of the process interception library. The process will be described as being performed by an appropriately programmed system of one or more computers.

The system determines whether the current process is a compiler (325), for example, in library initialization code as described above with reference to FIG. 3C.

The system determines whether to reverse the extractor order (345). The system can check system configuration settings or user preference settings to determine whether the order of the extractor and the compiler should be reversed.

If the order is not reversed, the system invokes an extractor with one or more source code files to be compiled (branch to 335), as described above with reference to FIG. 3C.

If the order is reversed, the system invokes a compiler with one or more source code files to be compiled (branch to 355). For example, the system can call a fork command and the default execve function to invoke a compiler process. The system can then wait for the compiler process to end.

The system invokes an extractor with one or more source code files to be compiled (365). The system can similarly call a fork command and the default execve function to invoke the extractor using the source code files to be compiled. The extractor will generally also have access to the files that have already been compiled by the compiler.

The system exits with the exit status of the compiler process (375). In order to make the extraction of the source code transparent to the build system, the system can provide the compiler's exit status to the parent process. Thus, if the compiler exited with errors, the parent process can respond accordingly.

Reversing the order of the extractor and the compiler for Windows-based systems will be described below with reference to FIG. 12.

Figure 4:
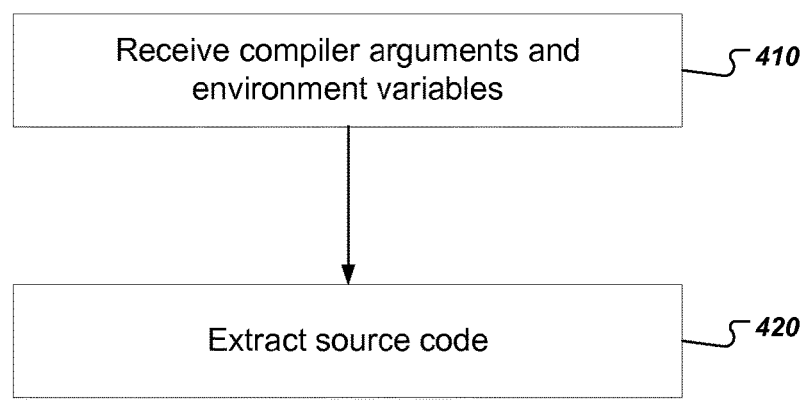
FIG. 4 is a flow chart of an example process for extracting source code.

FIG. 4 is a flow chart of an example process for extracting source code. The process can be performed by a source code extractor, e.g., the source code extractor 120 described in reference to FIG. 1. The process will be described as being performed by an appropriately programmed system of one or more computers.

The system receives compiler arguments and environment variables (410). The compiler arguments generally specify the source code files to be compiled as well as any command line arguments of the compiler. The system may also make use the environment variables to in order to access the source code files. For example, the environment variables may specify a path to the location of the source code files.

The system extracts source code (420). The system accesses the files and can store a copy of the source code files in a particular location. The system can also generate an intermediate representation of the source code in the source code files, which can be used to generate a database that represents source code in the project.

If the extractor is called after the compiler, as described above, the system can also receive the output of the compilation process, e.g., compiled object files and executable files.

Figure 5A:
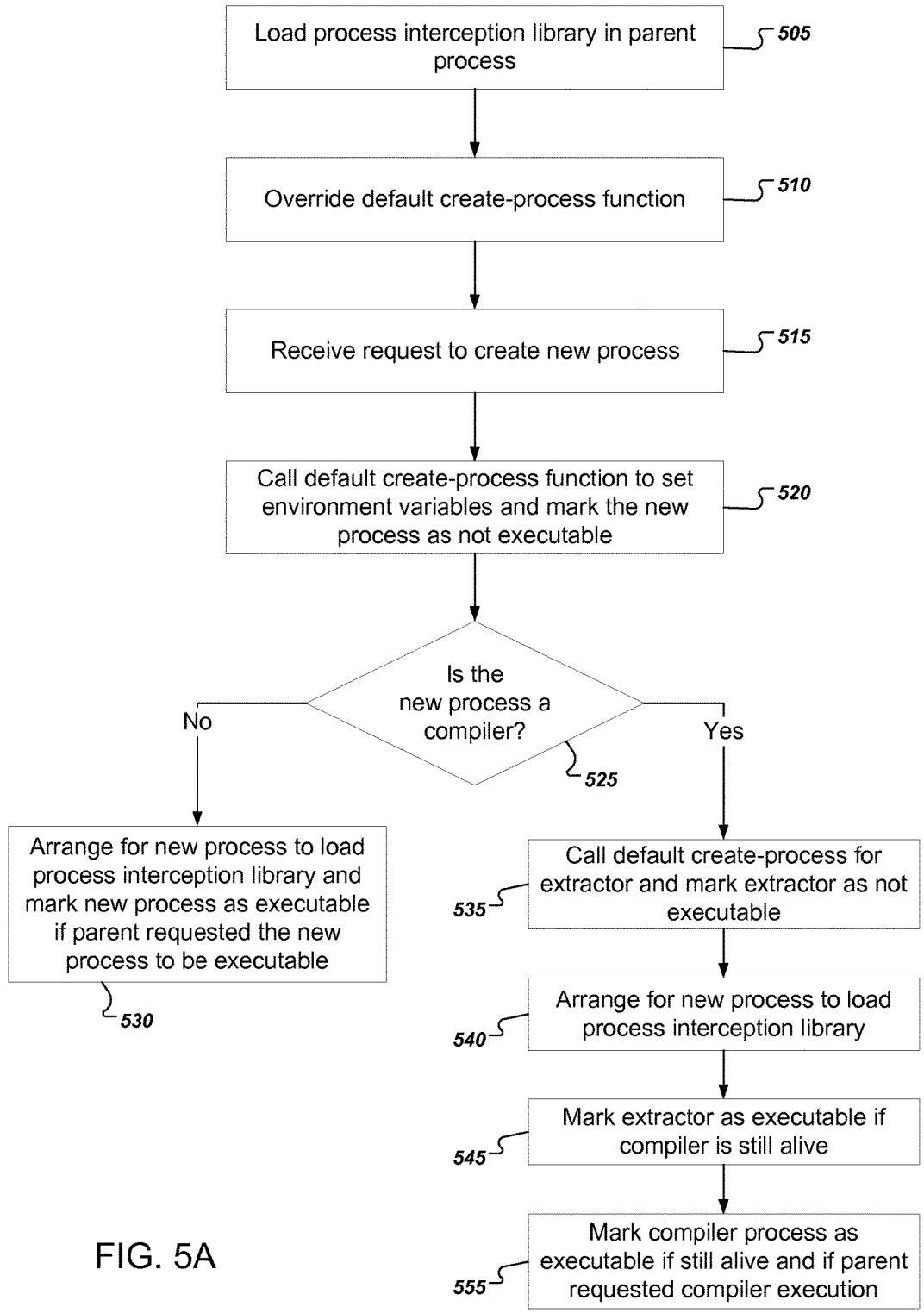
FIG. 5A is a flow chart of an example process performed by a custom create process function.

FIG. 5A is a flow chart of an example process performed by a custom create-process function. The process in FIG. 5A illustrates overriding default create-process functions, as is typically the case for Microsoft Windows-based systems. The process will be described as being performed by an appropriately programmed system of one or more computers.

The system loads the process interception library in a parent process (505). On Windows-based systems, the system can initiate an extraction process by calling a process that explicitly loads the process interception library. For example, the extraction utility 110 described in reference to FIG. 1 can explicitly load the process interception library.

FIGS. 6A-G illustrate example shared libraries loaded into process images. The parent process 610 represents memory allocated to a parent process. The actual definition of the various functions within a particular operating system library and their allocation within a particular process image may be different than illustrated on particular operating systems.

Figure 6A:
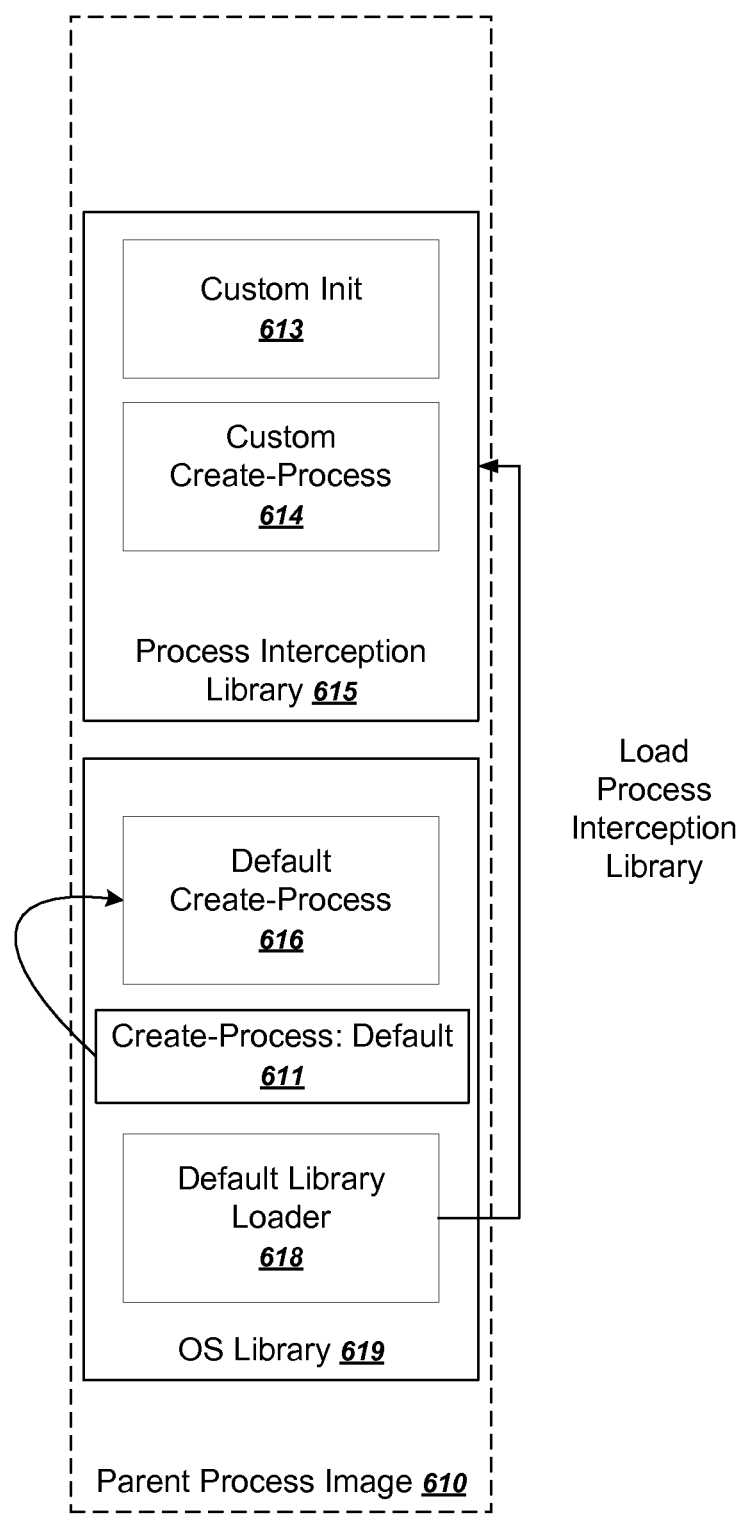
FIGS. 6A-6H illustrate example function modules loaded into process images.

In FIG. 6A, the parent process image 610 has loaded a default OS library 619 and the process interception library 615. However, the custom initialization function 613 within the process interception library 615 has not yet been executed. The OS library 619 includes a default create-process function 616 and a default library loader function 618. Although shown as a single library, the OS library 619 may actually represent multiple libraries. For example, on Windows-based systems, a new process loads ntdll.dll which includes the default library loader function LdrLoadDll. Loading ntdll.dll also causes the system to load kernell32.dll, which includes one of the default create-process functions, CreateProcess.

The process interception library 615 includes a custom initialization function 613 that runs when the process interception library 615 is loaded into a new process. The process interception library 615 also includes a custom create-process function 614.

The OS library 619 includes an export table 611 that specifies the addresses of all create-process functions within the OS library 619 that may be called by other functions in the parent process. In Microsoft Windows, for example, each shared library has its own an export table that specifies the addresses of functions available to other functions in the process. In FIG. 6A, the export table 611 includes an entry that points to the address of the default create-process function 616 in the process interception library 615.

Each shared library also has its own import table that specifies the functions it may call within other shared libraries. When the system loads the OS library 619, the operating system can prepopulate the import table by copying entries from the export tables of other shared libraries.

Thus, if the system overrides the default create-process function in the export table early enough in process initialization, the operating system will automatically propagate the overridden address of the default create-process function to the import tables of other shared libraries.

As shown in FIG. 5A, the system overrides a default create-process function (510). On Microsoft Windows-based systems, the default create-process function is the CreateProcess defined in kernel132.dll or related process creation functions which may be defined in kernel32.dll or other system libraries, e.g., CreateProcessA, CreateProcessW, CreateProcessAsUserA, CreateProcessAsUserW, CreateProcessWithLogonW, and CreateProcessWithTokenW.

The system can override the default create-process function using custom initialization code that runs when the process interception library is loaded. For example, the custom initialization code can overwrite an entry in an export table for the default create-process function so that the export table actually points to the custom create-process function of the process interception library.

By overriding the default create-process function in custom initialization code when the process interception library is loaded, the system can ensure that the address in the export table is overwritten early enough in process initialization that the operating system will populate the overwritten address into the import tables of other shared libraries.

Figure 6B:
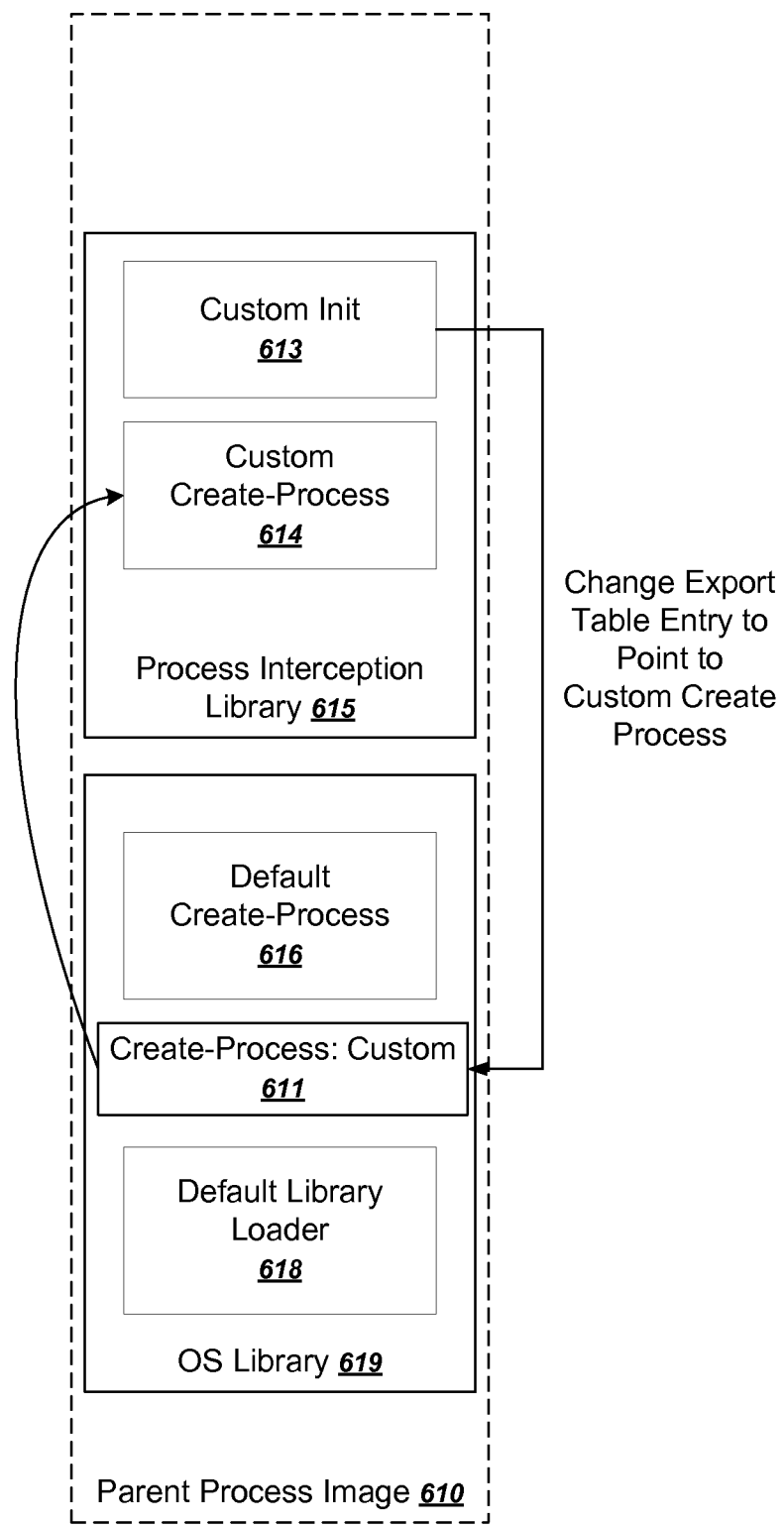

In FIG. 6B, the custom initialization function 613 overwrites the entry in the export table 611. Now the entry in the export table 611 for the create-process function points to the custom create-process function 614.

As shown in FIG. 5A, the system receives a request to create a new process (515). For example, the request may come from an extraction utility of the static analysis system invoking a new process in order to run a build utility of the build system. Because the export table has been overwritten, the call to the create-process function will actually call the custom create-process function.

The system calls the default create-process function to set environment variables and marks the new process as not executable (520). In process that have multiple threads, marking a process as executable can include marking a particular thread within the process as executable. The custom create-process function can create the new process by calling the default create-process function. The custom create-process function can initially request that the new process be marked as not executable so that the new process can be initialized properly. For example, the custom create-process function can ensure that the operating system does not attempt to execute the new process before the new process loads the process interception library.

The default create-process function allocates space in memory, loads the process image from disk into the allocated memory, loads the OS library into the new process, and sets the execution pointer to the main function of the process image.

Figure 6C:
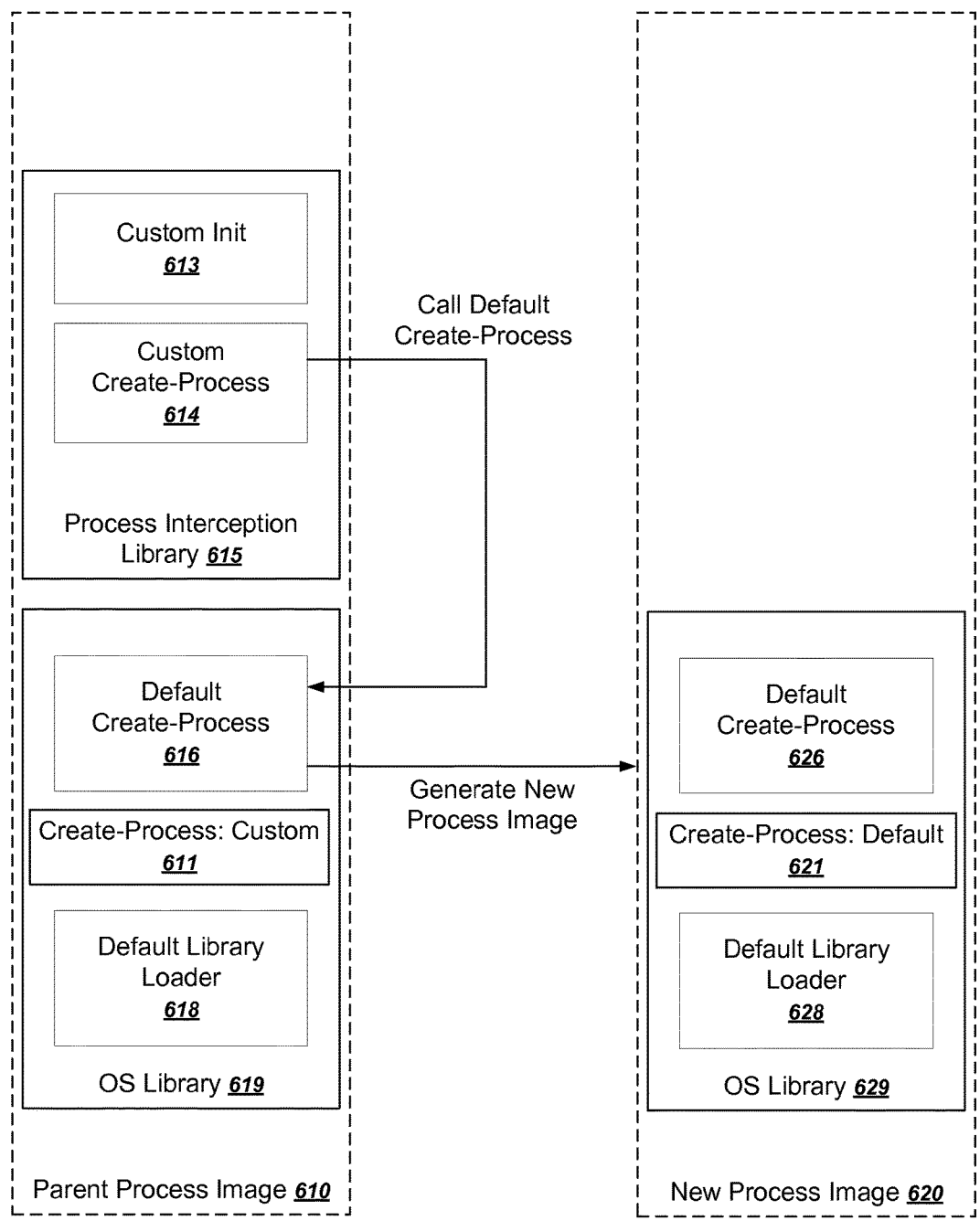

In FIG. 6C, the custom create-process function 614 calls the default create-process function 616. The default create-process function 616 then generates the new process image 620, loads the OS library 629 into the new process image 620, which now includes its own default create-process function 626 and its own default library loader function 628. For example, on Windows-based systems, the system loads ntdll.dll which includes the default library loader function LdrLoadDll. Loading ntdll.dll also enqueues a load of kernell32.dll, which includes the default create-process function CreateProcess.

As shown in FIG. 5A, the system determines whether the new process is a compiler (525). For example, the system can compare the location of the executable file of the new process to a list of known compilers or compare the name of the executable file to a regular expression, as described above with reference to FIG. 3A.

If the new process is not a compiler, the system arranges for the process interception library to be loaded in the new process and marks the process as executable if the parent process requested the new process to be executable (branch to 530). Arranging for the new process to load the process interception library will cause the new process to run library initialization code of the process interception library, which will override the default create-process function in the new process. This will be described in more detail below with reference to FIG. 5D.

If the new process is a compiler, the system calls the default create-process function to create a new process for the extractor and marks the extractor process as not executable (branch to 535). The system may optionally kill the newly created process, e.g., if the extractor is a copy of the newly created process but with different command-line arguments.

The system then arranges for the process interception library to be loaded in all new processes and marks the new processes as executable (540).

The system marks the extractor as executable if the compiler process is still alive (545). Marking the extractor as executable will cause the system to begin executing the extractor process. In some implementations, the system waits for the extractor to exit prior to marking the compiler process as executable.

The system can cause the compiler to run before the extractor by sending the newly created compiler and extractor processes requests to run respective remote procedure calls defined in the process interception library.

The system sends the extractor process a request to run a remote procedure call for a function that instructs the extractor to wait for the compiler to finish. The remote procedure call will generally specify the process ID and thread ID of the compiler. In some implementations, the function instructs the extractor to wait for a wake-up signal from the compiler process as specified by the process ID.

The system also sends the compiler process a request to run a remote procedure call for a function that wakes up the extractor when the compiler exits. Waking up the extractor process will be described in more detail below with reference to FIGS. 5B-C.

The system marks the compiler process as executable if the compiler process is still alive and if the parent process requested execution of the compiler process (555). The system will thus execute the compiler process once the threads are marked as executable.

Figure 5B:
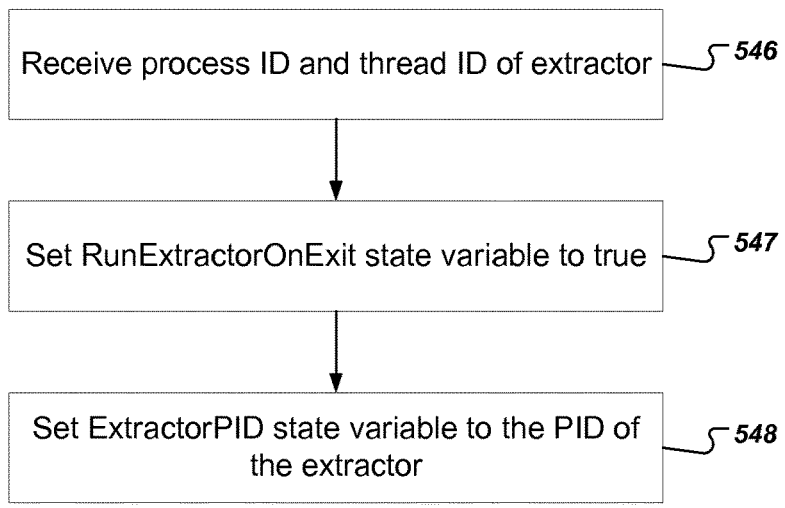
FIG. 5B is a flow chart of an example process performed by a compiler remote procedure call.

FIG. 5B is a flow chart of an example process performed by a compiler remote procedure call. In general, the compiler sets a flag that will be checked when the compiler exits. The process will be described as being performed by an appropriately programmed system of one or more computers.

The system receives a process ID and a thread ID of an extractor (546). The remote procedure call received from the parent process will specify the process ID and the thread ID of the newly created extractor process.

The system sets a RunExtractorOnExit state variable to true (547). The RunExtractorOnExit state variable is a variable of the compiler process that will be checked by custom deinitialization code of the process interception library. The custom deinitialization code is run when the compiler process exits.

The system sets the ExtractorPID state variable to the process ID of the extractor (548). By setting the RunExtractorOnExit state variable, the custom deinitialization code of the process interception library can send a wake-up signal to the extractor when exiting using the process ID of the extractor.

Figure 5C:
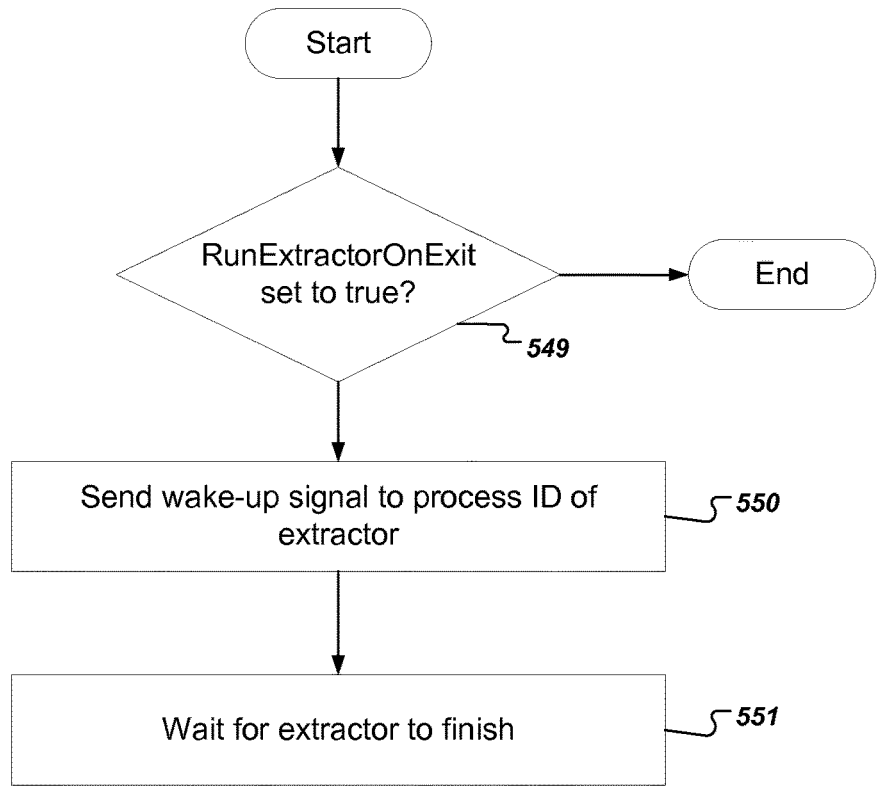
FIG. 5C is a flow chart of an example process performed by deinitialization code of a compiler process.

FIG. 5C is a flow chart of an example process performed by deinitialization code of a compiler process. In general, the deinitialization code checks a state variable to determine whether to send the extractor a wake-up signal. The process will be described as being performed by an appropriately programmed system of one or more computers.

The system determines whether the RunExtractorOnExit state variable is set to true (549). If the state variable is not set to true, the process ends.

If the state variable is set to true, the system sends a wake-up signal to the process ID of the extractor process (branch to 550). Upon receiving the wake-up signal, the extractor will extract source code of the source code files compiled by the compiler. The extractor will also generally have access to object code and other files generated by the compiler.

The system waits for the extractor process to finish (551). The compiler process can ensure that the extractor process is not inadvertently cleaned up by the build system by waiting for the extractor process to finish and can also ensure that the source code files have not been deleted by the build system.

Figure 5D:
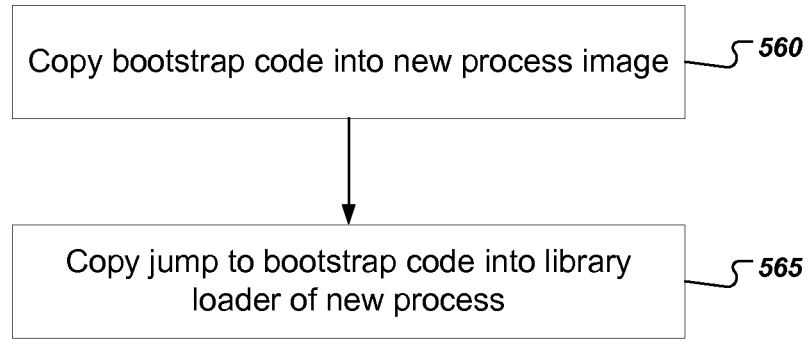
FIG. 5D is a flow chart of an example process for a parent process to arrange for a new process load the process interception library.

FIG. 5D is a flow chart of an example process for a parent process to arrange for a new process load the process interception library. The process in FIG. 5D can be performed on operating systems that lack shared library environment variables that cause a shared library to be loaded automatically in new processes, e.g., LD_PRELOAD in Linux. The process will be described as being performed by an appropriately programmed system of one or more computers.

For operating systems that do not support shared library environment variables that cause shared libraries to be loaded automatically in new processes, the system can override a library loader function that is responsible for loading shared libraries. For example, on Microsoft Windows, a function LdrLoadDll is called that is responsible for loading each shared library. The custom initialization code of the process interception library can override this function in order to force it to load the process interception library into a new process whenever a new process is created.

The system copies bootstrap code into the new process image (560). The system can allocate memory in the new process image and copy bootstrap code, which can be defined in the process interception library, into the new process. The bootstrap code includes functionality to restore an overridden library loader function and to call the restored library loader function to load the process interception library into the new process image.

The system copies a jump instruction to the bootstrap code into the library loader of the new process image (565). The system can modify the first instruction of the default library loader function to include a jump instruction or, for brevity, a "jump," to the bootstrap code.

Thus, when the library loader function is called by the new process, the new process will actually execute the jump instruction and begin executing the bootstrap code. The library loader function is typically called very early in the initialization of a new process, e.g., when loading kernel32.dll. The parent process can also mark the new process as executable.

Figure 6D:
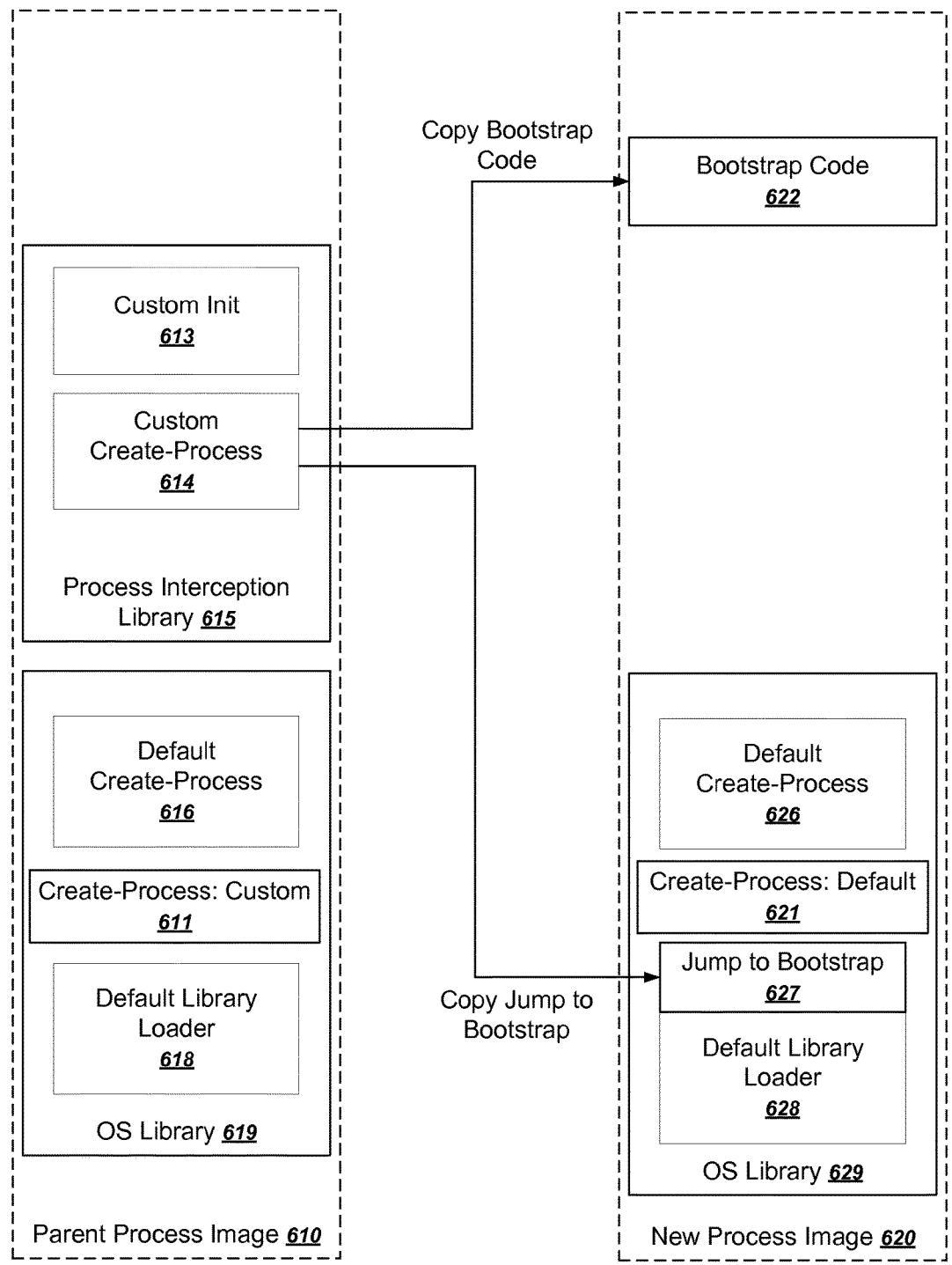

In FIG. 6D, the custom create-process function 614 allocates memory for and copies the bootstrap code 622 into the new process image 620. The custom create-process function 614 also writes a jump instruction to the bootstrap code 627 into the beginning of the default library loader function 628.

Figure 5E:
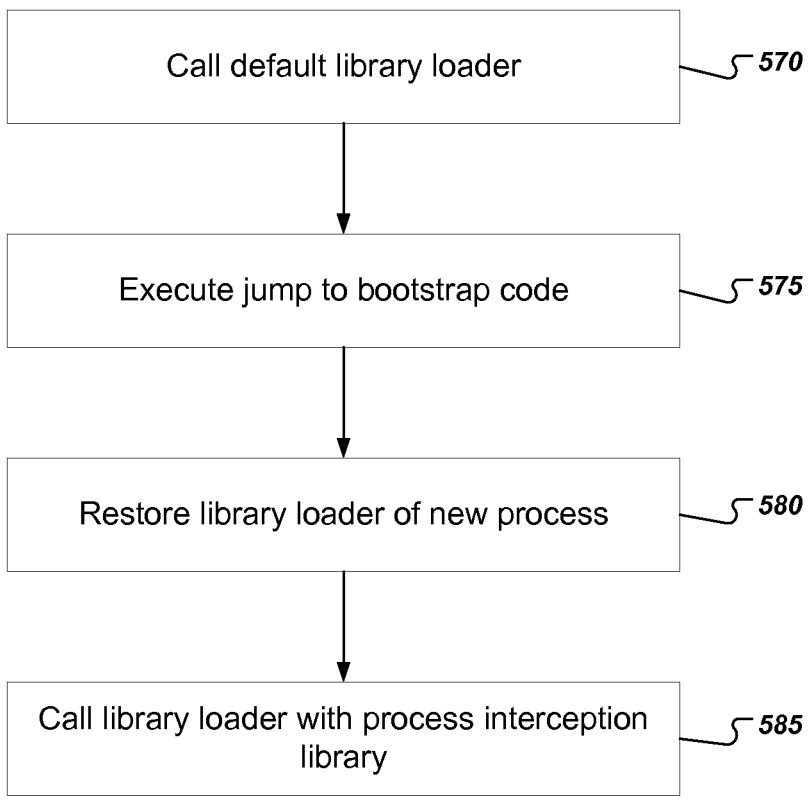
FIG. 5E is a flow chart of an example process for a new process to load a process interception library.

FIG. 5E is a flow chart of an example process for a new process to load a process interception library. A parent process has inserted bootstrap code into the new process and has altered a library loader function of the new process to include a jump instruction to the bootstrap code. The process will be described as being performed by an appropriately programmed system of one or more computers.

The system calls the default library loader (570). When the new process begins executing, the new process calls the default library loader in order to load libraries into the new process, e.g., an operating system library. However, the default library loader function now includes a jump into the bootstrap code.

The system executes a jump to the bootstrap code (575). Because the library loader function has been altered, the system actually executes the jump instruction to the bootstrap code inserted by the parent process.

Figure 6E:
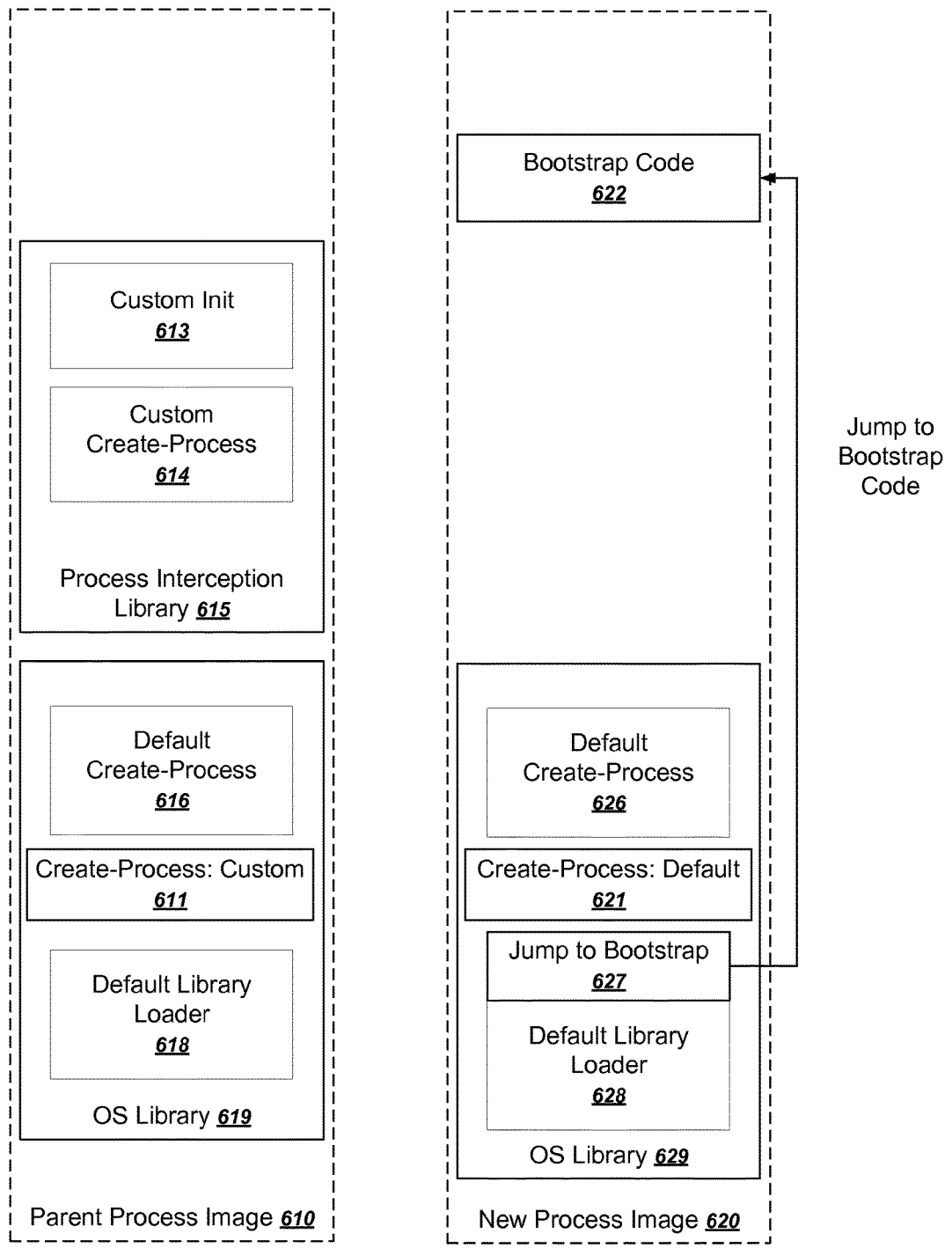

In FIG. 6E, when the new process begins to execute and requests that a library be loaded, the default library loader function 628 is called. The system will thus actually executes the jump to the bootstrap code 627.

As shown in FIG. 5E, the system restores the library loader of the new process image (580). After being called, the bootstrap code first restores the default library loader function by removing the jump to the bootstrap code and restoring the first bytes of code that had been there previously and had been overwritten by the jump to the bootstrap code.

The system then calls the default library loader function with the process interception library (585). The restored default library loader function will thus load the process interception library into the new process image. The system can then resume the original call to the library loader function.

Figure 6F:
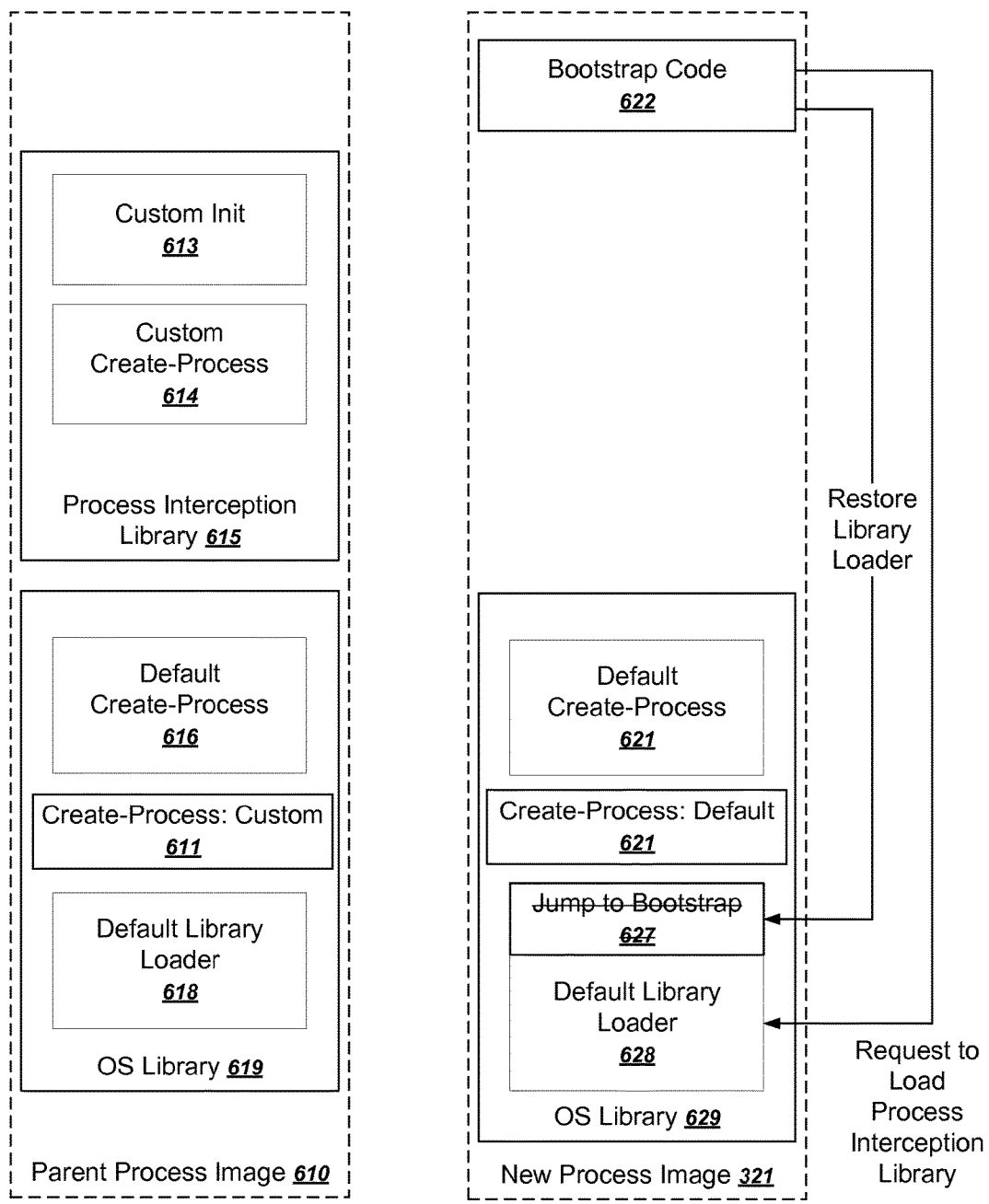

In FIG. 6F, the bootstrap code 622 restores the default library loader function 628, e.g., by deleting the jump to the bootstrap code 627. The bootstrap code 622 then calls the restored default library loader function 628 to load the process interception library.

Figure 6G:
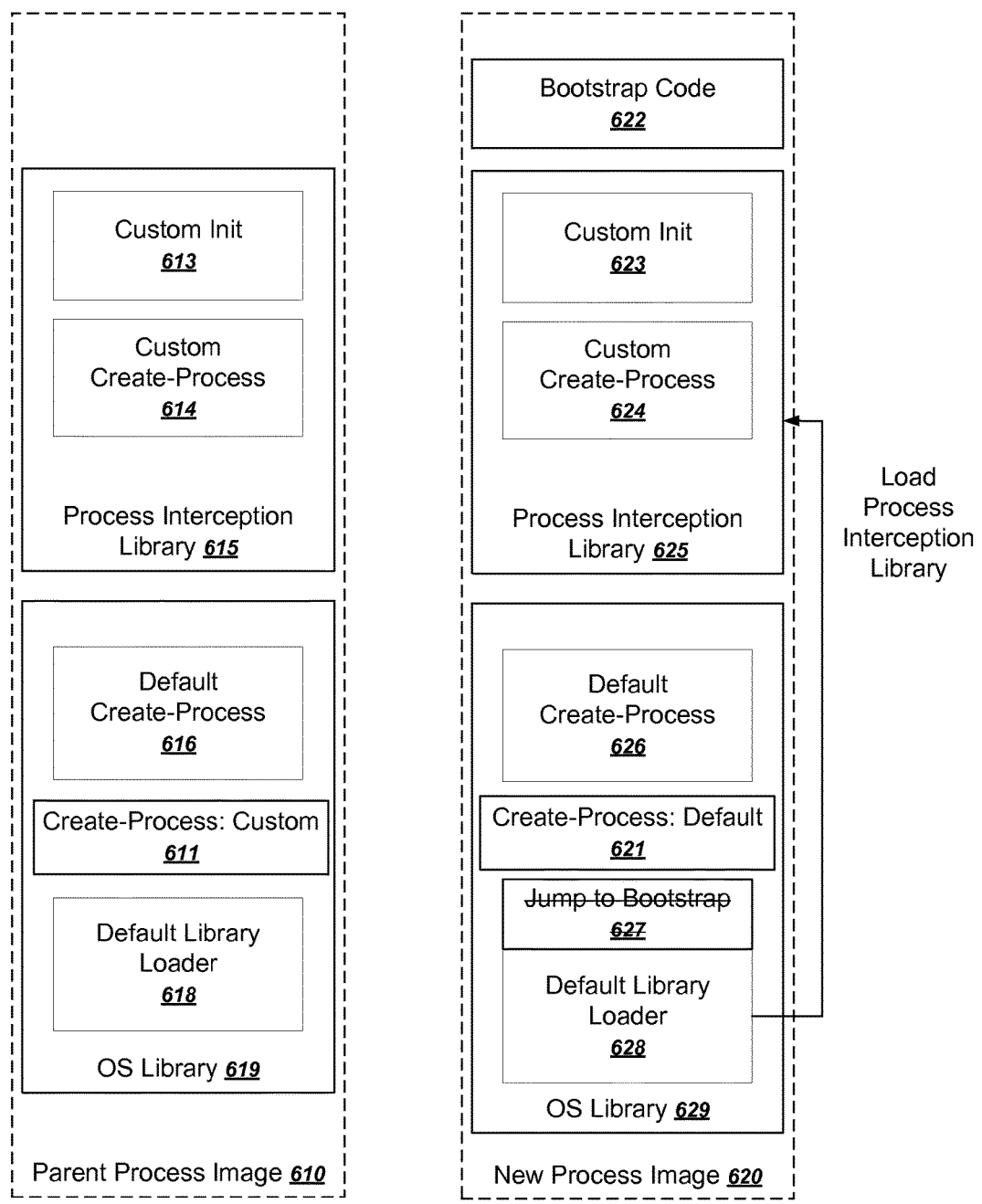

In FIG. 6G, the default library loader 628 loads the process interception library 625 into the new process image 620. Thus, the new process image 620 will now have its own copy of the custom initialization function 623 and the custom create-process function 624.

As mentioned above, loading the process interception library 625 causes the custom initialization function 623 to run, which will override the entry in the export table 621 thus preempting the default create-process function 626.

Figure 6H:
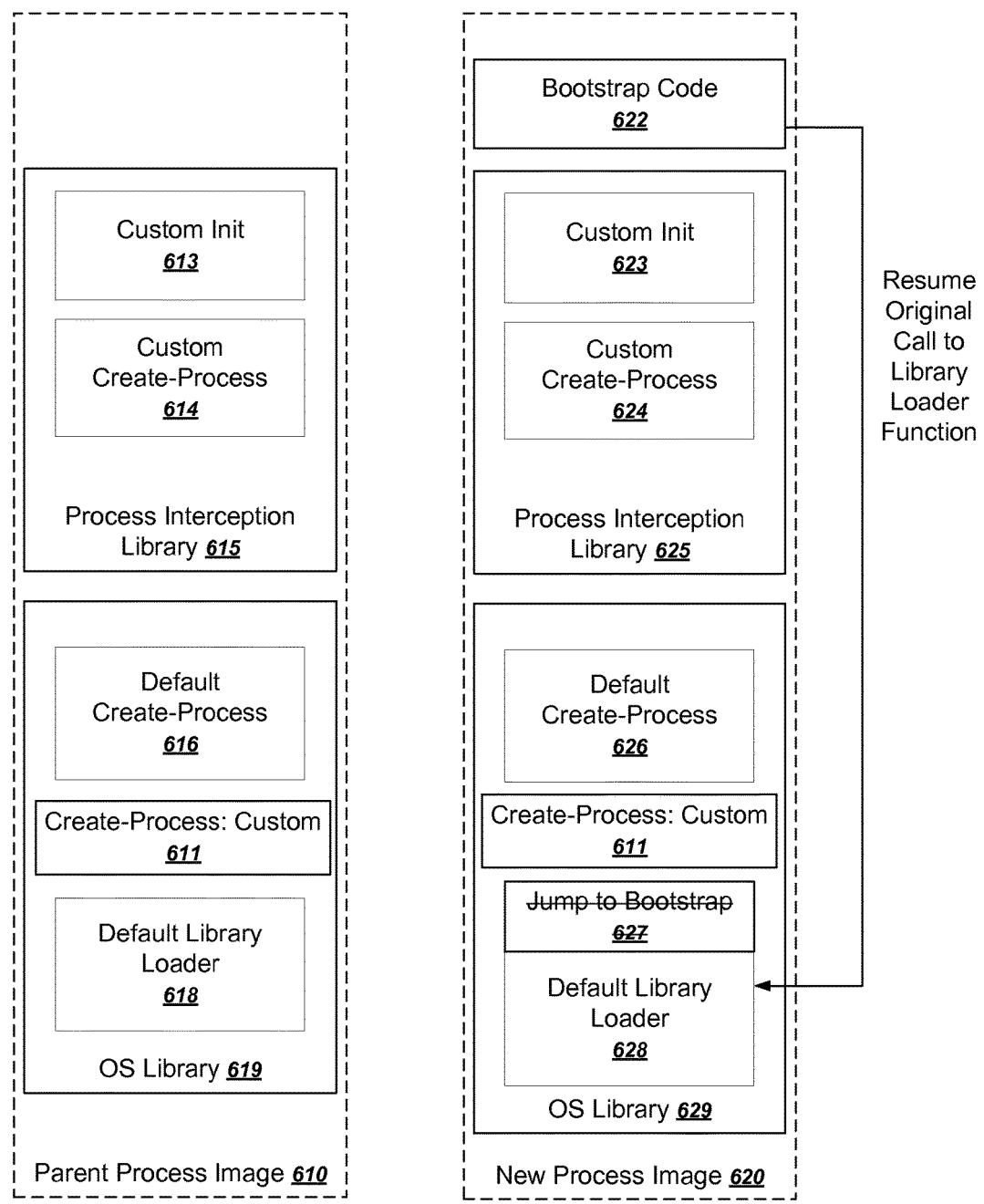

In FIG. 6H, after loading the process interception library, the bootstrap code can resume the original call to the default library loader function 628.

Figure 7:
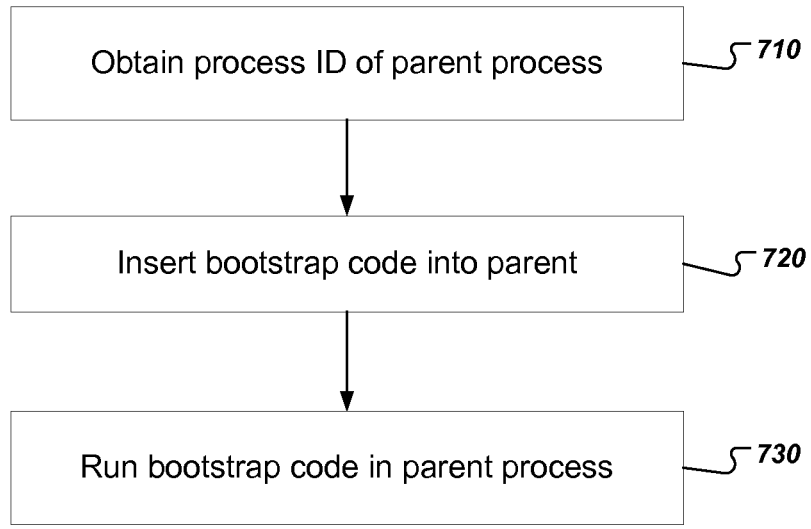
FIG. 7 is a flow chart of an example process for preempting process creation functions in preexisting process trees.

FIG. 7 is a flow chart of an example process for preempting process creation functions in preexisting process trees. In some situations, the build process may not be started by a static analysis system. For example, a continuous integration server can be configured to repeatedly spawn build utilities to compile source code of the project. The process in FIG. 7 can be performed by a tracer process of the static analysis system that handles preempting process creation functions. The system can configure the build utility of the build system to first invoke the tracer process before initiating any builds on the build system. For example, a user can add a command that invokes the tracer process at the beginning of a "makefile" that coordinates a build process on the build system. The process will be described as being performed by an appropriately programmed system of one or more computers.

The system obtains the process ID of a parent process (710). The system can for example make a call to NtQuerylnformationProcess defined in ntdll.dll to request basic process information. A field conventionally named Reserved3 in the returned PROCESS_BASIC_INFORMATION structure represents the parent process ID.

The system inserts bootstrap code into the parent process image (720). As described above with reference to FIG. 5, the bootstrap code can make a request to load the process interception library into the parent process. In this case however, the bootstrap code is being inserted from a child process into a parent process.

The bootstrap code for preexisting process trees can also additionally handle overriding the default create-process functions in the parent process. For example, the system can queue a remote procedure call (RPC) in the parent process, which can be called by the bootstrap code when executed.

The system runs the bootstrap code in the parent process (730). For example, on Microsoft Windows, the system can execute the function CreateRemoteThread to create a thread in the parent process and instruct the thread to run the bootstrap code in the parent process.

As described above with reference to FIG. 5E, the bootstrap code in the parent process loads the process interception library using the library loader function. If the head of the library loader function was altered, the bootstrap code can restore it. And as described above, loading the process interception library will also cause the parent process to execute library initialization code associated with the process interception library.

However, the system may not be able to effectively preempt the default create-process function in the library initialization code. For example, because the parent process has already been executing, the parent process may have already cached the addresses in the export and import tables.

The system can instead use the bootstrap code to preempt the default create-process function. For example, if the child process requested an RPC, the bootstrap code can execute the requested RPC, which will handle preempting the process creation functions.

Preempting the default process creation function in an existing parent process will be described in more detail with reference to FIGS. 8-10.

Figure 8:
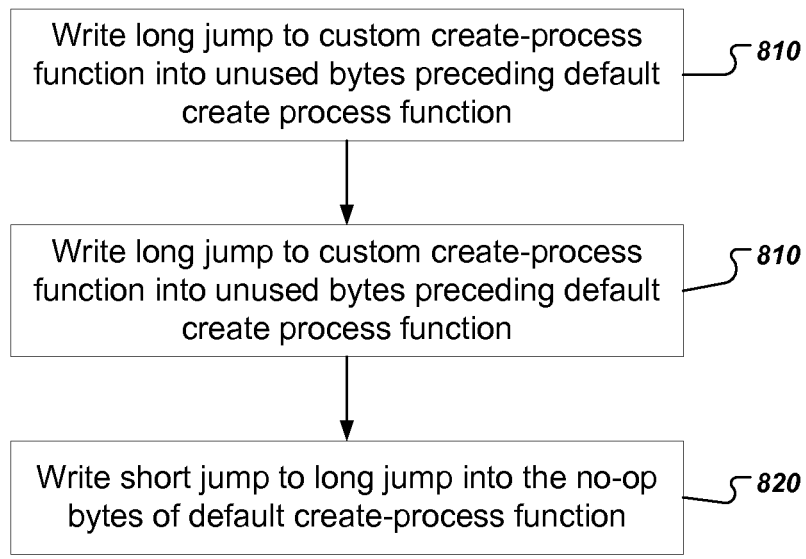
FIG. 8 is a flow chart of an example process for overriding a default create-process function in a preexisting 32-bit parent process.

FIG. 8 is a flow chart of an example process for overriding a default create-process function in a preexisting 32-bit parent process. In general, the system can modify the default create-process function to include an unconditional jump instruction to a custom create-process function of the process interception library. In some 32-bit operating systems, e.g., Microsoft Windows, some functions are "hot-patchable," meaning that they are designed to be replaceable at runtime. For hot-patchable functions, the five bytes that immediately precede the start of a function are unused, and the two bytes at the start of the function are a no-op instruction. The process will be described as being performed by an appropriately programmed system of one or more computers.

The system writes a long jump to the custom create-process function into the unused bytes of the default create-process function (810). The five unused bytes are enough to include a jump anywhere in the 32-bit address space.

The system writes a short jump to the long jump into the no-op bytes of the default create-process function (820). Now, when the default create-process function is called, the system takes a short jump to the long jump and then a long jump to the custom create-process function.

If the custom create-process function needs to create a new process using the default create-process function, the custom create-process function can do so by jumping to the start of the default create-process function, which is the address immediately after the 2-byte no-op instruction.

Figure 9A:
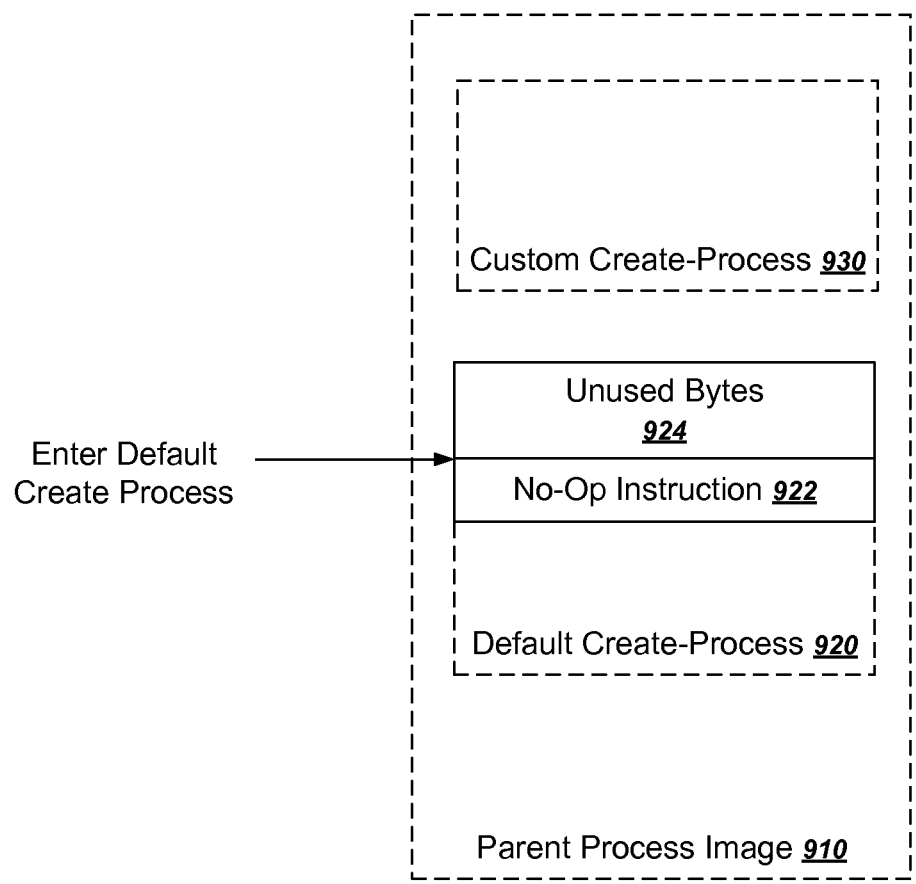
FIGS. 9A-B illustrate overriding the default process creation function in a 32-bit address space.
Figure 9B:
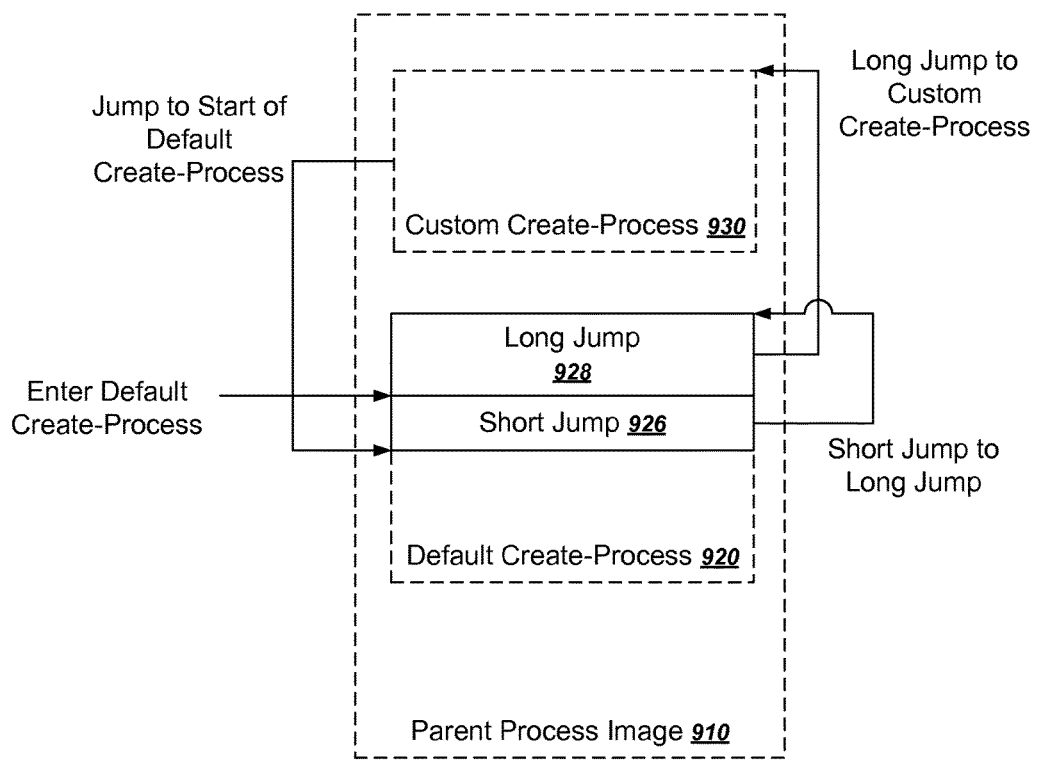

FIGS. 9A-B illustrate overriding the default process creation function in a 32-bit address space. In FIG. 9A, the default create-process function 920 can be called by a jump to the no-op instruction 922. The unused bytes 924 include the five bytes immediately preceding the no-op instruction at the beginning of the default create-process function 920.

The system can override the default create-process function by overwriting the unused bytes 924 and the no-op instruction 922. Afterwards, a jump to the default create-process function 920 results in a jump to the custom create-process function 930.

In FIG. 9B, the default create-process function 920 now starts with a short jump 926. The short jump 926 includes a jump to the long jump 928 in the unused bytes immediately preceding the default create-process function 920.

The long jump 928 includes a jump to the start of the custom create-process function 930. If the custom create-process function 930 needs to call the default create-process function 920, the custom create-process function 930 can use a jump to the actual start of the default create-process function 920. In other words, the jump is to the address immediately after the short jump 926.

Thus, when the system calls the default create-process function 920, the system takes the short jump 926 to the long jump 928. The system then takes the long jump 928 to the custom create-process function 930.

Now that the default create-process function has been overridden in the parent process, every process that the parent process spawns will also load a custom create-process function, as described above with reference to FIGS. 5D-5E and FIGS. 6A-6H.

Figure 10:
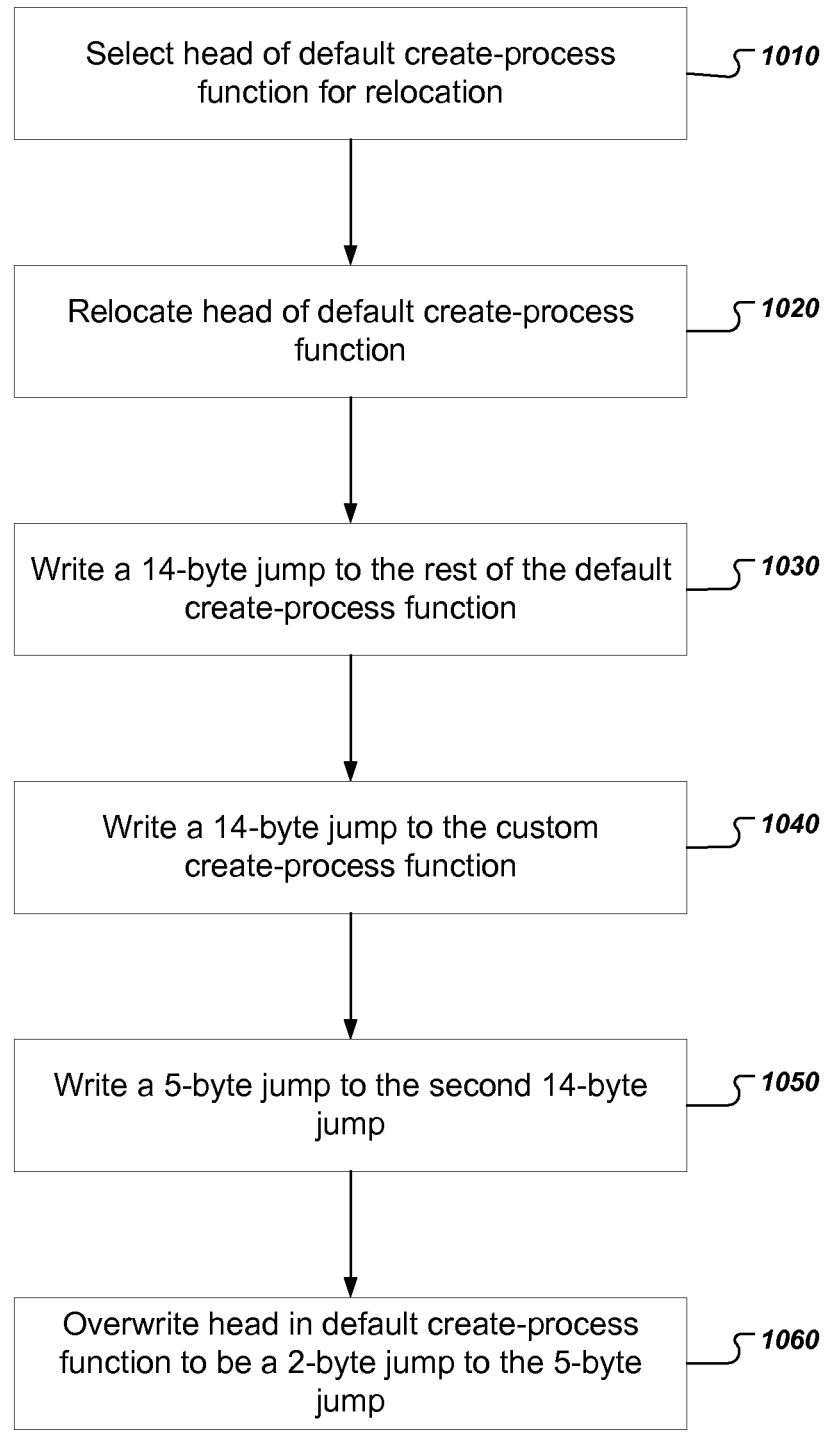
FIG. 10 is a flow chart of an example process for overriding a default create-process function in a preexisting 64-bit parent process.

FIG. 10 is a flow chart of an example process for overriding a default create-process function in a preexisting 64-bit parent process. In some 64-bit operating systems, e.g., Microsoft Windows, bytes immediately preceding the function are not guaranteed to be unused, and the two bytes at the start of the function are not no-op instructions. Thus, the system can relocate the head of the default process creation function to make room for the first of a series of unconditional jump instructions, including a new intermediate jump instruction, to the custom process creation function. The process will be described as being performed by an appropriately programmed system of one or more computers.

The system selects a head of the default create-process function for relocation (1010). In general, the system selects a particular whole number of instructions in the prefix of the function's prologue. In some implementations, the system also selects a head that is at least two bytes long.

The function prologue is a segment of code at the start of a function that initializes a function's stack frame. In some 64-bit operating systems, e.g., Microsoft Windows, every dynamically linked library has an exception-unwind table that includes information about the prologue of each function defined in the library. The exception-unwind table has information including how large the function prologue is and where the instruction boundaries in the prologue are.

The system relocates the head of the default create-process function (1020). The system can allocate memory elsewhere in the process and copy the head of the default process creation function to the new location.

The system writes a 14-byte jump to the rest of the default process creation function (1030). The system writes the 14-byte jump at an address immediately after the relocated head of the default process creation function. In this example, the system uses 14 bytes for a full long jump. However, the system can select any appropriate jump instruction can cover the entire address space of the parent process. For a 64-bit operating system, the system can use 14 bytes because some 64-bit architectures, e.g., AMD64, do not provide a primitive jump for 64-bit displacements. The jump can take execution of the process to the start of the portion of the default process creation function that was not in the relocated head.

The system writes a 14-byte jump to the custom create-process function (1040). The 14-byte jump to the custom create-process function can generally be located at any appropriate address of the process, e.g., address that are within $2^{31}$ bytes from the 5-byte jump below.

The system writes a 5-byte jump to the 14-byte jump to custom create-process function (1050). The system chooses an intermediate size jump to increase the probability that the system can find enough space that is within range of a jump that fits within the space of the relocated head. Thus, if the relocated head included two bytes, the system can choose the intermediate jump to be a 5-byte jump. The system places the intermediate jump at an address location that is within range of a 2-byte jump. The system overwrites the head in the default create-process function to be a 2-byte jump to the 5-byte jump (1060). By rewriting the head of the create-process function to be a jump, the system overrides the default create-process function. Now, when the default create-process function is called, a series of jumps is initiated that ends at the custom create-process function. When the custom create-process function needs to create a new process by calling the default create-process function, the system can jump to the relocated head, which then causes a 14-byte jump back to the rest of the default create-process function.

In some cases, the system can omit the intermediate jump if the location of the 14-byte jump to the custom create-process function is within range of the 2-byte jump. Thus, the system can instead write the 2-byte jump to be a jump right to the 14-byte jump to the custom create-process function.

Figure 11A:
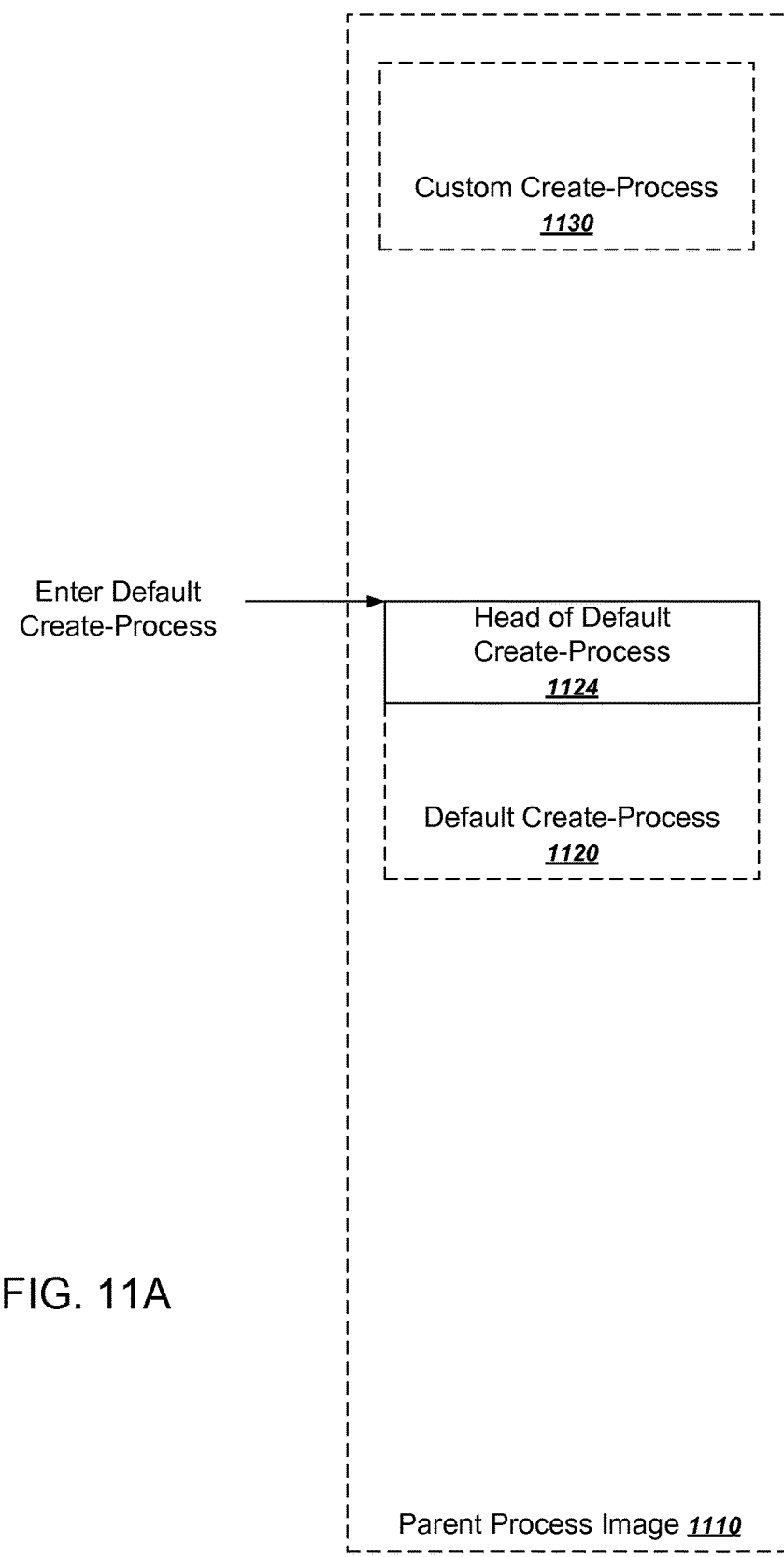
FIGS. 11A-11B illustrate overriding the default process creation function in a 64-bit address space.
Figure 11B:
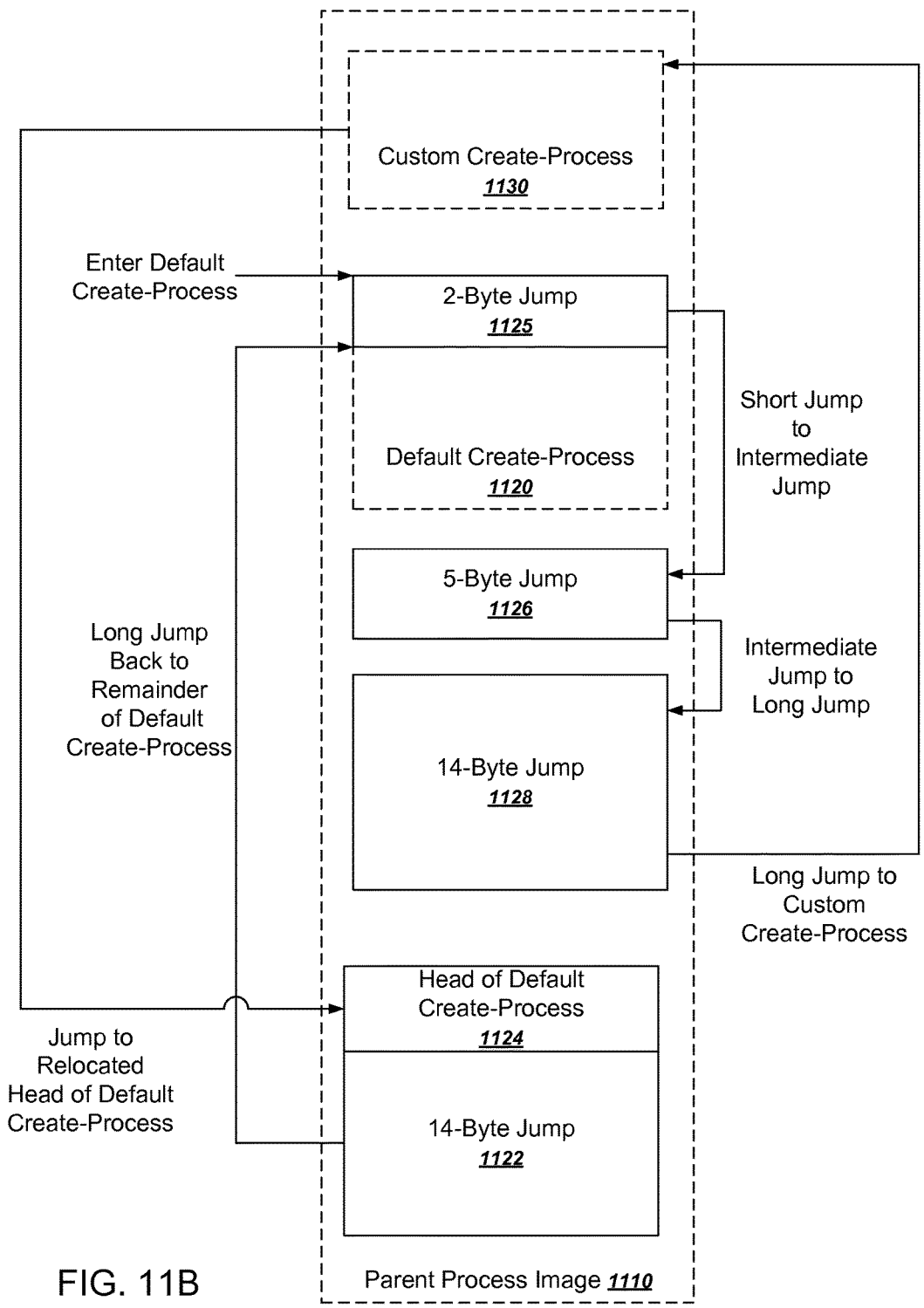

FIGS. 11A-11B illustrates overriding the default process creation function in a 64-bit address space. In FIG. 11A, the default create-process function 1120 has a head 1124 at the beginning. The system can relocate the head 1124 and include in the parent process image 1110 a series of jumps to the custom create-process function 1130.

In FIG. 11B, the system has relocated the head 1124 of the default create-process function 1120, and the system has written a first 14-byte jump 1122 back to the rest of the default create-process function 1120.

The system has added a 2-byte jump 1125 in place of the head 1124 at the start of the default create-process function 1120. The system has also added a 5-byte jump 1126 to a second 14-byte jump 1128 to the custom create-process function 1130.

Thus, when the system calls the default create-process function 1120, the system takes the 2-byte jump 1125 to the 5-byte jump 1126. The system then takes the 5-byte jump 1126 to the 14-byte jump 1128. The system then takes the 14-byte jump to the custom create-process function 1130.

To call the default create-process function 1120, the custom create-process function 1130 can jump to the relocated head of the default create-process function 1124. The system then takes a 14-byte jump 1122 back to the remainder of the default create-process function 1120.

Figure 12:
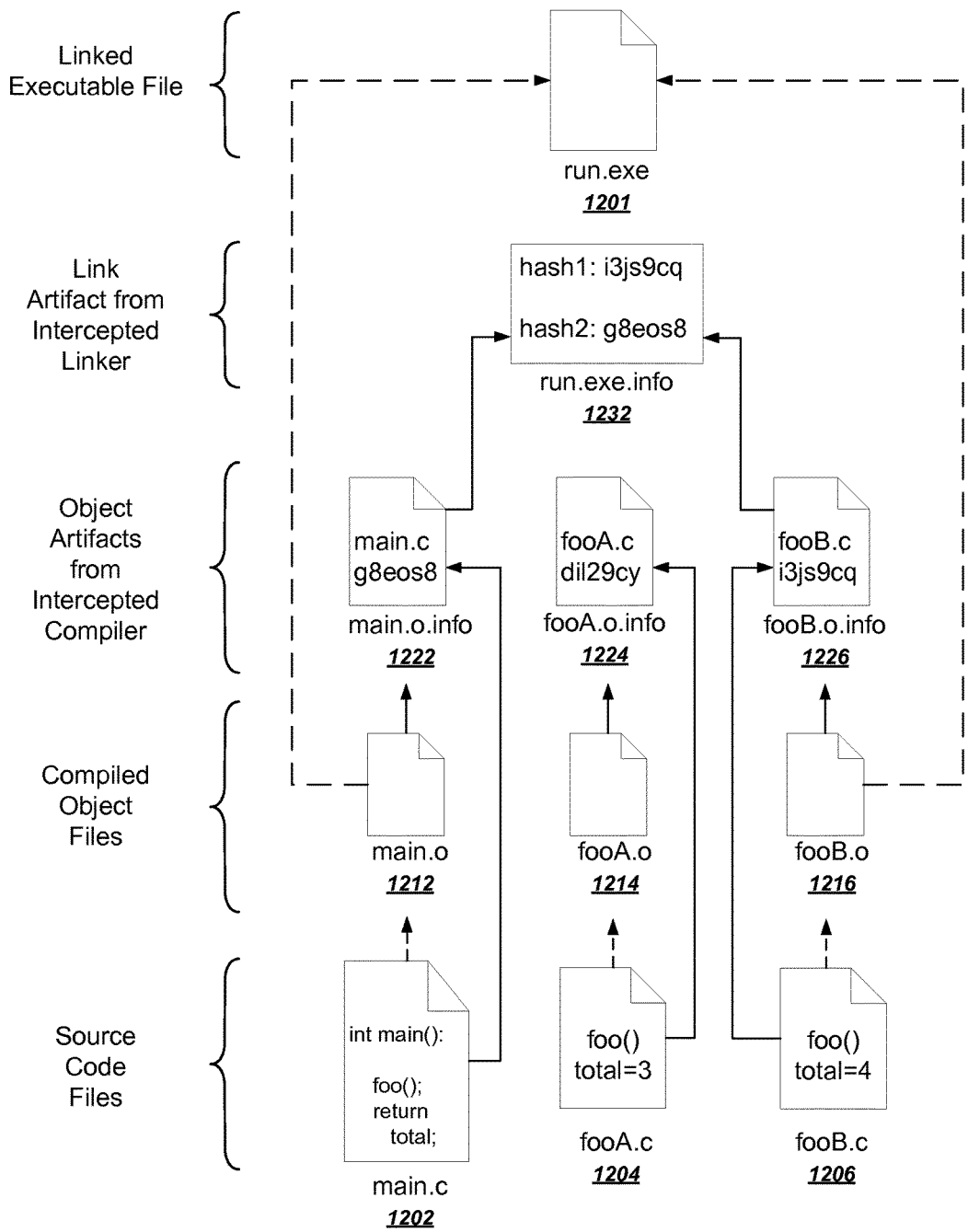
FIG. 12 illustrates files generated after intercepting calls to a linker and a compiler.

FIG. 12 illustrates files generated after intercepting calls to a linker and a compiler. By intercepting calls to linkers, a static analysis system can obtain and record information about object files that are linked to generate executable files. And by intercepting calls to compilers as well, a static analysis system can obtain and record information about source code files used to compile those object files.

By doing so, a static analysis system can unambiguously identify externally linked symbols used to generate an executable file, even when multiple symbols having the same name are defined in the source code. A static analysis system can do so even if the original object files and source code files are deleted, moved, or renamed by the build system during the build process. The static analysis system can also do so without modifying or emulating the build system.

For example, a static analysis system can intercept calls to compilers and linkers in a build system in order to determine which of source code files main.c 1202, fooA.c 1204, and fooB.c 1206 were used to generate the executable file run.exe 1201.

In this example, the source code files fooA.c 1204 and fooB.c 1206 define symbols having the same name but different definitions. In other words, both define a function named "foo( )" and a variable named "total." By merely examining the source code of these files or by intercepting compilers that were called during the build process, it is generally not possible to determine which of these definitions the build system used to generate the executable file run.exe 1201. Thus, the system can intercept calls to linkers as well.

When a compiler of the build system compiles the source code files, the compiler will generate corresponding object files main.o 1212, fooA.o 1214, and fooB.o 1216. A static analysis system can intercept calls to the compiler to generate an object artifact for each generated object file. Thus, the static analysis system can generate corresponding object artifacts for each of the compiled object files: a main.o.info object artifact 1222 for main.o 1212, a fooA.o.info object artifact 1224 for fooA.o 1214, and a fooB.o.info object artifact 1226 for fooB.o 1216.

In FIG. 12, a dashed arrow from a first file to a second file represents that the first file was used as input to a build system process that generates the second file. A solid arrow from a first file to a second file represents that the first file was used as input to a static analysis system process that generates the second file.

In general, an artifact is a collection of data generated by a static analysis system, as opposed to an object file or an executable generated by a compiler or a linker. The examples in this specification will refer to artifacts being stored as files in a file system. However, artifacts can also be stored in any appropriate data repository, e.g., as records in a database.

Each object artifact stores information about the source code from which the corresponding object file was generated in addition to a representation of the contents of the corresponding object file. For example, the main.o.info artifact 1222 stores "main.c" to indicate that the corresponding object file was generated by compiling the main.c 1202 source code file. The main.o.info artifact 1222 can also store the location of the main.c file 1202, e.g., a path to the main.c file 1202 in a file system.

Each object artifact also stores a representation of the contents of the corresponding object file. For example, the static analysis system can generate a hash value of the contents of the corresponding object file. The system can use any appropriate hashing function to generate a hash value of the contents of the object file, e.g., message digest algorithm 5 (MD5) or the secure hash algorithm 1 (SHA-1). Thus, the example main.o.info artifact 1222 also stores a hash value "g8eos8" of the contents of the corresponding main.o object file 1212.

A linker of the build system links object files to generate the executable file run.exe 1201. A static analysis system can intercept calls to the linker so that the static analysis system can generate a link artifact for each generated executable file. For example, the static analysis system can generate a run.exe.info link artifact 1232 from the object artifacts of object files used to generate the corresponding run.exe executable file 1201.

The run.exe.info link artifact 1232 stores representations of the contents of object files used to link the corresponding executable file. Thus, the run.exe.info link artifact 1232 stores two hash values: "i3js9cq" from the fooB.o.info object artifact 1226 and "g8eos8" from the main.o.info object artifact 1222. These hash values represent the hashed contents of object files used to link the run.exe executable file 1201.

The first hash value "i3js9cq" matches the hash value stored in the fooB.o.info object artifact 1226. Therefore, the static analysis system can determine that the source code file identified by the fooB.o.info object artifact 1226, i.e., fooB.c 1206, was used to generate the run.exe executable file 1201.

Similarly, the second hash value "g8eos8" matches the hash value stored in the main.o.info object artifact 1222. Therefore, the static analysis system can determine that the source code file identified by the main.o.info object artifact 1222, i.e., main.c 1202, was used to generate the run.exe executable file 1201.

Notably, the static analysis system can determine that source code of fooA.c 1204 was not used to generate the executable file 1201, even though the run.exe executable file 1201 and the source code file fooA.c 1204 may have some of the same symbol definitions.

In this way, the static analysis system can unambiguously determine that the symbols "foo" and "total" were defined in either main.c 1202 or fooB.c 1206 and not in fooA.c 1204.

Figure 13:
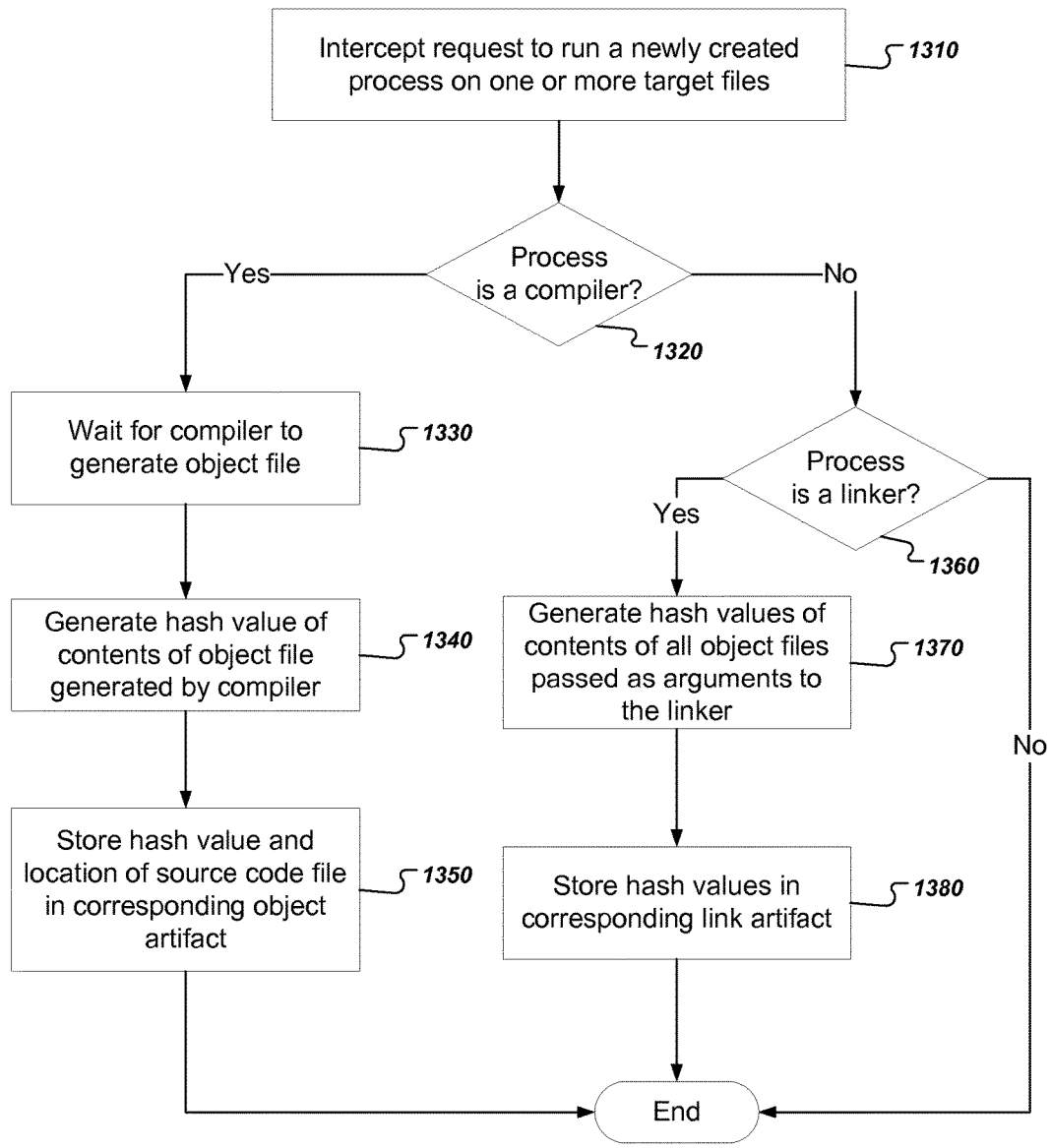
FIG. 13 is a flow chart of an example process for generating object artifacts and link artifacts after intercepting calls to compilers and linkers.

FIG. 13 is a flow chart of an example process for generating object artifacts and link artifacts after intercepting calls to compilers and linkers. The system can generate object artifacts for corresponding object files after intercepting calls to a compiler. The system can generate link artifacts for corresponding executable files after intercepting calls to a linker. The process will be described as being performed by an appropriately programmed system of one or more computers, e.g., the static analysis system 102 described in reference to FIG. 1.

The system intercepts a request to run a newly created process (1310). As described above, the system can intercept requests to create new processes with a custom create-process function and can then take specific actions depending on the type of the newly created process. The system will generally have access to all command line arguments and environment variables of the new process, including the name of the process.

The system determines whether the newly created process is a compiler (1320). As described above, the system can maintain a list of process names that are compilers and can determine whether the name of the newly created process corresponds to the name, location, or identifier of a compiler.

Some compilers, including gcc, can be invoked as linkers when they are called with particular command line arguments. Thus, the system can also examine the command line arguments passed to the newly created process to determine whether a program is being invoked as a compiler or as a linker.

If the newly created process is a compiler, the system waits for the compiler to generate an object file (branch to 1330). The system can wait for the compiler to generate an object file by running a source code extractor after the compiler exits, e.g., as described above with reference to FIG. 3C for Unix-based systems and FIG. 5C for Windows-based systems.

The system generates a hash value of the contents of the object file generated by the compiler (1340). The system can inspect the command line arguments or environment variables passed to the compiler to determine the location of the object file generated by the compiler. Alternatively, the system can look for the object file in a default location.

The system stores the hash value and the location of the source code file in a corresponding object artifact (1350). The system can obtain the location of the source code file from the command line arguments provided to the compiler. If multiple source code files were provided to the compiler, the system can store the location of all source code files that the compiler used to generate the corresponding object files.

Because the build system is not being modified or emulated, the system will also have access to the location of the source code files that the compiler was asked to compile. The system can then store the hash value of the object file along with the location of the source code files in an object artifact associated with the object file.

If the process was not a compiler, the system determines whether the process is a linker (branch to 1360). The system can similarly maintain a list of the names, locations, or identifiers of build system linkers and use the name of the newly created process, command line arguments to the newly created process, or both, to determine whether the newly created process is a linker.

If the newly created process is not a compiler or a linker, the process ends (branch to End). For example, the system can call the default create-process function to transparently, to the build system, execute the newly created process.

If the newly created process is a linker, the system generates respective hash values of the contents of all object files passed as arguments to the linker (branch to 1370). The system can use the command line arguments passed to the linker to obtain the locations of the object files. The system can then generate respective hash values of the contents of all the object files.

Some linkers can be invoked with archived library files that store multiple object files, sometimes in a compressed format. If the linker is called with an archived library file, the system can first decompress and extract the individual object files from the archived library file. The system can then generate and store hash values for all extracted object files in the archived library file so that hash values in the link artifact will match the hash values for each of the individual object files, rather than a hash value for the entire archived library file.

The system can then store the hash values of the object files in a corresponding link artifact (1380). Each link artifact stores an association between the executable file generated by the linker and the hash values of the object files used to generate the executable file. Because the link artifact does not rely on the contents of the executable file itself, the system can generate the link artifact either before or after the linker exits.

Figure 14:
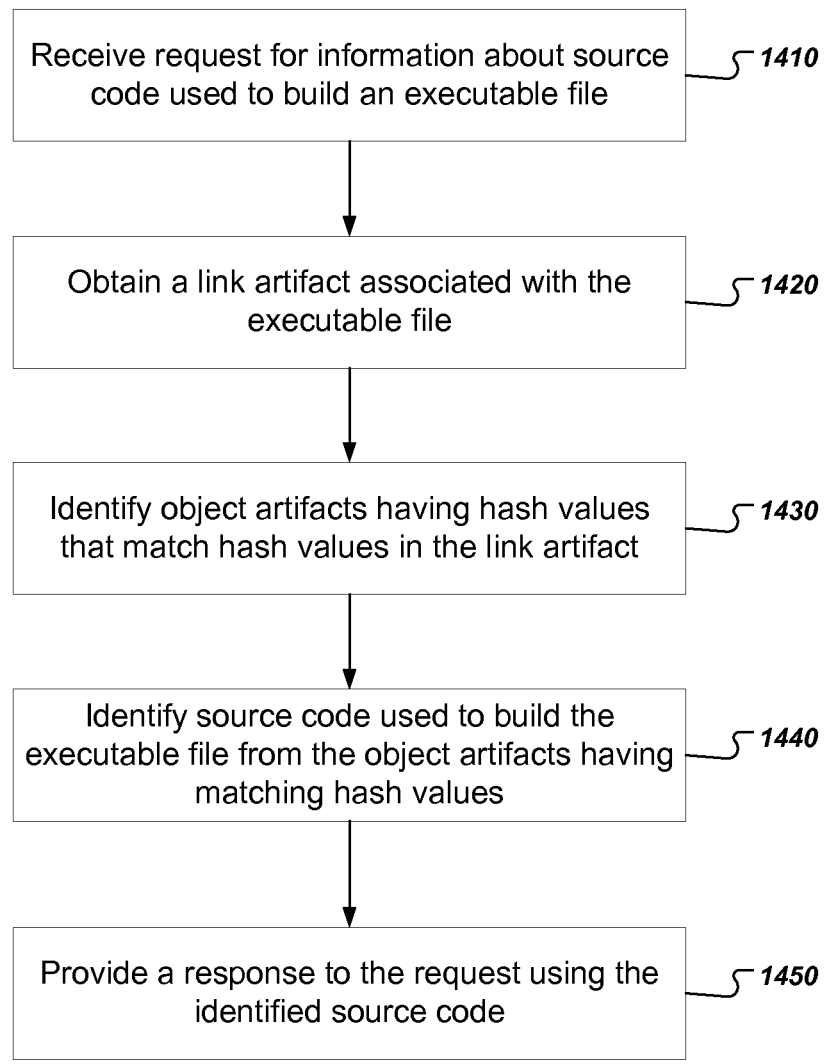
FIG. 14 is a flow chart of an example process for identifying the source code used to build an executable file.

FIG. 14 is a flow chart of an example process for identifying the source code used to build an executable file. The process will be described as being performed by an appropriately programmed system of one or more computers.

The system receives a request for information about source code used to build an executable file (1410). In many situations, examining symbols in the executable file is insufficient to determine which source code files were used to build the executable file, e.g., executable files that lack debug information. Source code files often have symbols with the same names but different definitions. In addition, a build system may move, rename, and delete source code files during the build process. Thus, the source code files used to build the executable file may no longer exist as they did when the executable file was generated.

For example, a user can provide a query to a static analysis system for information about the number of lines of source code used to build a particular executable file. As another example, a project may include many source code files with the function name "main." A user may thus want to determine which "main" function was used to generate a particular executable file.

The system obtains a link artifact associated with the executable file (1420). After intercepting calls to linkers, the static analysis system will have generated link artifacts for each executable file generated by linkers in the build system.

The system identifies object artifacts having hash values matching the hash values in the link artifact (1450). The system can use any appropriate searching technique to determine which object files have hash values that match the hash values in the link artifact. For example, the system can build an index from hash values to object artifacts. Alternatively, the system can compare each hash value of each object artifact to the hash values in the link artifact.

The system identifies the source code used to build the executable file from the object artifacts having matching hash values (1460). The object artifacts having matching hash values will list the source code files that were used to generate the executable file.

The system can access the source code in the source code files themselves. However, the source code files themselves may no longer exist. Thus, the system can access source code that was extracted by intercepting compiler calls or an intermediate representation of the source code.

The system provides a response to the request using the identified source code (1450). After identifying the source code used to generate the executable file, the system can compute a result that satisfies the request. For example, the system can compute a number of lines of source code used to generate the executable file or a name of the source code file that defines the "main" routine of the executable file. The system can then provide the computed result in response to the request, e.g., back to a user device associated with a user making the request.

Figure 15:
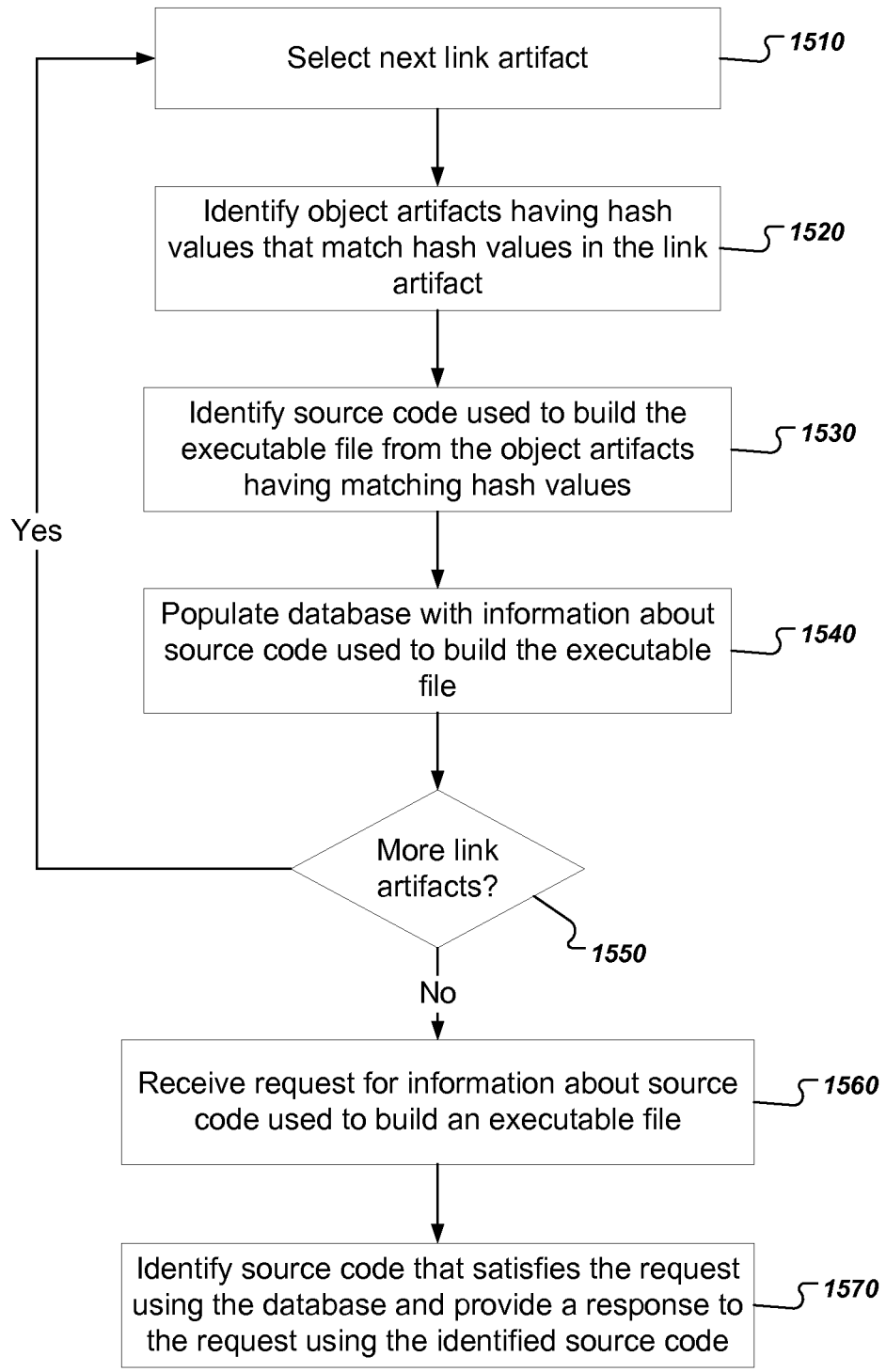
FIG. 15 is a flow chart of another example process for identifying source code used to build an executable file.

FIG. 15 is a flow chart of another example process for identifying source code used to build an executable file. In some implementations, the system can reduce querying time by using the link artifact and object artifacts to generate a database that associates each executable file directly with the source code used to build the executable file. After generating the database, thus, the system need not maintain the link artifacts or object artifacts. The process will be described as being performed by an appropriately programmed system of one or more computers.

The system selects a next link artifact (1510). The system can iterate over all link artifacts that the system generated by intercepting calls to linkers during a build process, e.g., as described above with reference to FIG. 13.

The system identifies object artifacts having hash values that match hash values in the link artifact (1520), and identifies source code used to build the executable file from the object artifacts having matching hash values (1530), for example, as described above with reference to FIG. 14.

The system populates a database with information about source code used to build the executable file (1540). After identifying source code used to build the executable file, the system can associate the executable file with information about the source code or attributes of the source code in the database.

For example, the system can analyze the source code used to generate the executable file using any appropriate static analysis technique. The system can then generate any appropriate attributes about the source used to generate the executable file, e.g., a number of lines of source code used to build the executable file, and associate the executable file with the computed attributes.

In particular, the system can generate disambiguation information that unambiguously identifies the definitions of the symbols in the source code used to build the executable file. Thus, the system can associate, in the database, each symbol used in the executable file to a location in the source code that defines the symbol. Similarly, the system can associate the executable file with the location of each symbol used to build the executable file. In other words, for each symbol used in source code used to build the executable file, the system can associate the executable file with either the symbol and the location in the code base where the symbol was defined or the source code that defines the symbol itself.

The system then determines whether more link artifacts remain (1550). If so, the system selects a next link artifact for processing (branch to 1510). If not, the system can begin servicing queries about executable files in the system using the database (branch to 1560). In some implementations, the system need not wait for all link artifacts to be generated before servicing queries using the database.

The system receives a request for information about source code used to build an executable file (1560). For example, the system can receive a query requesting the source code that defines a function "foo( )" that is called within the executable file.

The system identifies source code that satisfies the request using the database and provides a response to the request using the identified source code (1570). For example, the system can locate the symbol "foo" in the database to obtain information about the source code that defines the function "foo( )." Thus, other potential definitions of "foo" elsewhere in the code base are inherently disregarded. The system can then provide the source code that defines the function "foo( )" in response to the request.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As alternatives or additions to the attached claims and the embodiments described above, the following embodiments are also innovative:

Embodiment 1 is a computer-implemented method of associating an executable file with one or more source code files used to generate the executable file, the method comprising determining that a first newly created process is a compiler, the compiler being invoked to compile a source code file; after the compiler exits, generating a first hash value of an object file generated by the compiler; generating an object artifact that identifies the source code file and includes the first hash value of contents of the object file generated by the compiler; determining that the second newly created process is a linker, the linker being invoked to generate an executable file from one or more object files, including the object file;

generating a link artifact that includes respective hash values of each of the one or more object files used to generate the executable file; and providing the link artifact and object artifact to a static analysis system, whereby the static analysis system associates the executable file with source code used to build the executable file including matching hash values in the link artifact with hash values of the one or more object files and identifying source code in source code files identified by object artifacts associated with the one or more object files.

Embodiment 2 is the method of embodiment 1, the method further comprising receiving a request to identify one or more attributes of source code used to build the executable file; computing one or more attributes from source code associated with the executable file; and providing the one or more computed attributes in response to the request.

Embodiment 3 is the method of any one of embodiments 1 through 2, wherein computing the one or more attributes from source code associated with the executable file comprises: identifying the link artifact associated with the executable file; identifying one or more object artifacts having one or more hash values matching respective hash values in the link artifact; identifying one or more source code files identified by the one or more object artifacts; and computing the one or more attributes from source code of the one or more source code files identified by the one or more object artifacts.

Embodiment 4 is the method of any one of embodiments 2-3, wherein the request is a request to identify one or more source code files used to build the executable file.

Embodiment 5 is the method of embodiment 4, the method further comprising designating the one or more source code files as source code files used to build the executable file without comparing symbols in the executable file or in the respective source code files.

Embodiment 6 is the method of any one of embodiments 2-3, wherein the request is a request to identify source code that defines an externally linked symbol used in the executable file.

Embodiment 7 is the method of any one of embodiments 2 or 4-6, the method further comprising: receiving a plurality of link artifacts generated from a build process; and processing each particular link artifact of the plurality of link artifacts, including: identifying one or more object artifacts having hash values matching hash values in the particular link artifact, identifying one or more source code files used to build the executable file from the one or more object artifacts having hash values matching hash values in the particular link artifact, and populating a database that associates the executable file with source code from the identified one or more source code files, wherein computing the one or more attributes from source code associated with the executable file comprises querying the database for source code associated with the executable file.

Embodiment 8 is the method of any one of embodiments 1-7, wherein a build system that launches the compiler or the linker deletes, renames, or moves one or more of the respective source code files or one or more of the matching object files during a build process.

Embodiment 9 is the method of any one of embodiments 1-8, wherein the executable file does not include identifying information about the one or more object files used to build the executable file.

Embodiment 10 is the method of any one of embodiments 1-9, wherein the one or more object files do not include identifying information about the source code files used to generate the object files.

Embodiment 11 is the method of any one of embodiments 1-10, wherein determining that the second newly created process is a linker comprises intercepting a request to run the second newly created process.

Embodiment 12 is the method of any one of embodiments 1-11, wherein determining that the second newly created process is a linker comprises: loading, by the second newly created process, a process interception library; and determining, by library initialization code of the process interception library, that the second newly created process is a linker.

Embodiment 13 is the method of embodiment 12, the method further comprising setting a shared library environment variable, wherein the shared library environment variable causes an operating system to load the process interception library into the second newly created process.

Embodiment 14 is the method of any one of embodiments 1-11, wherein determining that the second newly created process is a linker comprises receiving, by a custom create-process function that overrides a default create-process function of a parent process, a request to execute code of an executable file in the second newly created process, wherein the request specifies a location of one or more object files; and determining, by the custom create-process function, that the executable file is a linker.

Embodiment 15 is a computer-implemented method for associating executable files with source code used to build the executable files, the method comprising: receiving a plurality of link artifacts generated from a build process, wherein each link artifact includes respective hash values for each of one or more object files used to generate the executable file; processing each particular link artifact of the plurality of link artifacts, including: identifying one or more object artifacts having hash values matching hash values in the particular link artifact, wherein each object artifact identifies a source code file used to generate an object file corresponding to the object artifact, identifying one or more source code files used to build the executable file from the one or more object artifacts having hash values matching hash values in the particular link artifact, and populating a database that associates the executable file with source code from the identified one or more source code files; receiving a request for one or more attributes of source code used to build the executable file; computing one or more attributes from the source code associated with the executable file in the database; and providing the one or more computed attributes in response to the request.

Embodiment 16 is the method of embodiment claim 15, the method further comprising: determining that a first newly created process is a compiler, the compiler being invoked to compile a source code file; after the compiler exits, generating a first hash value of an object file generated by the compiler; generating an object artifact that identifies the source code file and includes the first hash value of contents of the object file generated by the compiler; determining that the second newly created process is a linker, the linker being invoked to generate an executable file from one or more object files, including the object file; and generating one of the plurality of link artifacts, the link artifact including respective hash values of each of the one or more object files used to generate the executable file.

Embodiment 17 is the method of embodiment 16, wherein determining that the second newly created process is a linker comprises intercepting a request to run the second newly created process.

Embodiment 18 is the method of any one of embodiments 16-17, wherein determining that the second newly created process is a linker comprises: loading, by the second newly created process, a process interception library; and determining, by library initialization code of the process interception library, that the second newly created process is a linker.

Embodiment 19 is the method of embodiment 18, the method further comprising: setting a shared library environment variable, wherein the shared library environment variable causes an operating system to load the process interception library into the second newly created process.

Embodiment 20 is the method of embodiment 16, wherein determining that the second newly created process is a linker comprises: receiving, by a custom create-process function that overrides a default create-process function of a parent process, a request to execute code of an executable file in the second newly created process, wherein the request specifies a location of one or more object files; and determining, by the custom create-process function, that the executable file is a linker.

Embodiment 21 is the method of any one of embodiments 15-20, wherein the request is a request to identify one or more source code files used to build the executable file.

Embodiment 22 is the method of embodiment 21, the method further comprising designating the one or more source code files as source code files used to build the executable file without comparing symbols in the executable file or in the respective source code files.

Embodiment 23 is the method of any one of embodiments 15-20, wherein the request is a request to identify source code that defines an externally linked symbol used in the executable file.

Embodiment 24 is the method of any one of embodiments 15-23, wherein a build system that launches the compiler or the linker deletes, renames, or moves one or more of the respective source code files or one or more of the matching object files during a build process.

Embodiment 25 is the method of any one of embodiments 15-24, wherein the executable file does not include identifying information about the one or more object files used to build the executable file.

Embodiment 26 is the method of any one of embodiments 15-25, wherein the one or more object files do not include identifying information about the source code files used to generate the object files.

Embodiment 27 is a computer-implemented method for identifying source code used to generate an executable file, the method comprising: receiving a link artifact corresponding to an executable file, the link artifact including one or more hash values of one or more object files used to generate the executable file; obtaining matching object artifacts, the matching object artifacts being object artifacts that include hash values that match the one or more hash values in the link artifact; and designating source code of respective source code files identified by the one or more object artifacts as source code used to build the executable file.

Embodiment 28 is the method of embodiment 27, the method further comprising: determining that a first newly created process is a compiler, the compiler being invoked to compile a source code file; after the compiler exits, generating a first hash value of an object file generated by the compiler; generating an object artifact that identifies the source code file and includes the first hash value of contents of the object file generated by the compiler; determining that the second newly created process is a linker, the linker being invoked to generate an executable file from one or more object files, including the object file; and generating the link artifact including respective hash values of each of the one or more object files used to generate the executable file.

Embodiment 29 is the method of embodiment 28, wherein determining that the second newly created process is a linker comprises intercepting a request to run the second newly created process.

Embodiment 30 is the method of any one of embodiments 28-29, wherein determining that the second newly created process is a linker comprises: loading, by the second newly created process, a process interception library; and determining, by library initialization code of the process interception library, that the second newly created process is a linker.

Embodiment 31 is the method of embodiment 30, the method further comprising: setting a shared library environment variable, wherein the shared library environment variable causes an operating system to load the process interception library into the second newly created process.

Embodiment 32 is the method of embodiment 28, wherein determining that the second newly created process is a linker comprises: receiving, by a custom create-process function that overrides a default create-process function of a parent process, a request to execute code of an executable file in the second newly created process, wherein the request specifies a location of one or more object files; and determining, by the custom create-process function, that the executable file is a linker.

Embodiment 33 is the method of any one of embodiments 27-32, the method further comprising: receiving a request to identify one or more attributes of source code used to build the executable file; computing one or more attributes from the source code used to build the executable file; and providing the one or more computed attributes in response to the request.

Embodiment 34 is the method of embodiment 33, wherein the request is a request to identify one or more source code files used to build the executable file.

Embodiment 35 is the method of embodiment 34, the method further comprising designating the one or more source code files as source code files used to build the executable file without comparing symbols in the executable file or in the respective source code files.

Embodiment 36 is the method of embodiment 33, wherein the request is a request to identify source code that defines an externally linked symbol used in the executable file.

Embodiment 37 is the method of any one of embodiments 27-36, wherein a build system that launches the compiler or the linker deletes, renames, or moves one or more of the respective source code files or one or more of the matching object files during a build process.

Embodiment 38 is the method of any one of embodiments 27-37, wherein the executable file does not include identifying information about the one or more object files used to build the executable file.

Embodiment 39 is the method of any one of embodiments 27-38, wherein the one or more object files do not include identifying information about the source code files used to generate the object files.

Embodiment 40 is a system comprising: one or more computers and one or more storage devices storing instructions that are operable, when executed by the one or more computers, to cause the one or more computers to perform the actions of any of embodiments 1-39.

Embodiment 41 is a computer storage medium encoded with a computer program, the program comprising instructions that are operable, when executed by data processing apparatus, to cause the data processing apparatus to perform the actions of any of embodiments 1-39.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of associating an executable file with one or more source code files used to generate the executable file, the method comprising:
   intercepting a first request to an operating system function, wherein the intercepted first request identifies a first executable to be executed in a first newly created process;
   determining that the first executable identified by the intercepted first request is a compiler, the compiler being invoked to compile a source code file and generate an object file;
   invoking the compiler to compile the source code file into the object file;
   after the compiler exits, generating a first hash value of contents of the object file generated by the compiler;
   generating an object artifact that identifies the source code file and includes the first hash value of contents of the object file generated by the compiler;
   intercepting a second request to the operating system function, wherein the intercepted second request identifies a second executable to be executed in a second newly created process;
   determining that the second executable identified by the intercepted second request is a linker, the linker being invoked to generate an executable file from one or more object files, including the object file;
   generating a link artifact that includes respective hash values of each of the one or more object files used to generate the executable file; and
   providing the link artifact and object artifact to a static analysis system that associates the executable file with source code used to build the executable file by matching hash values in the link artifact with hash values of the one or more object files and identifying source code in source code files identified by object artifacts associated with the one or more object files.

2. The method of claim 1, further comprising:
   receiving a request to identify one or more attributes of source code used to build the executable file;
   computing one or more attributes from source code associated with the executable file; and
   providing the one or more computed attributes in response to the request.

3. The method of claim 2, wherein computing the one or more attributes from source code associated with the executable file comprises:
   identifying the link artifact associated with the executable file;
   identifying one or more object artifacts having one or more hash values matching respective hash values in the link artifact;
   identifying one or more source code files identified by the one or more object artifacts; and
   computing the one or more attributes from source code of the one or more source code files identified by the one or more object artifacts.

4. The method of claim 2, wherein the request is a request to identify one or more source code files used to build the executable file.

5. The method of claim 4, further comprising designating the one or more source code files as source code files used to build the executable file without comparing symbols in the executable file or in the respective source code files.

6. The method of claim 2, wherein the request is a request to identify source code that defines an externally linked symbol used in the executable file.

7. The method of claim 2, further comprising:
   receiving a plurality of link artifacts generated from a build process; and
   processing each particular link artifact of the plurality of link artifacts, including:
      identifying one or more object artifacts having hash values matching hash values in the particular link artifact,
      identifying one or more source code files used to build the executable file from the one or more object artifacts having hash values matching hash values in the particular link artifact, and
      storing, in a database, an entry for the executable file, wherein the database associates the entry for the executable file with one or more attributes of source code from the identified one or more source code files,
   wherein computing the one or more attributes from source code associated with the executable file comprises querying the database for source code associated with the executable file.

8. The method of claim 1, wherein a build system that launches the compiler or the linker deletes, renames, or moves one or more of the respective source code files or one or more of object files corresponding to the one or more object artifacts during a build process.

9. The method of claim 1, wherein the executable file does not include identifying information about the one or more object files used to build the executable file.

10. The method of claim 1, wherein the one or more object files do not include identifying information about the source code files used to generate the object files.

11. The method of claim 1, wherein determining that the second newly created process is a linker comprises intercepting a request to run the second newly created process.

12. The method of claim 1, wherein determining that the second newly created process is a linker comprises:
    loading, by the second newly created process, a process interception library; and
    determining, by library initialization code of the process interception library, that the second newly created process is a linker.

13. The method of claim 12, further comprising:
    setting a shared library environment variable, wherein the shared library environment variable causes an operating system to load the process interception library into the second newly created process.

14. The method of claim 1, wherein intercepting the second request to the operating system function to execute a second executable in a second newly created process comprises intercepting, by a custom create-process function that overrides requests to a default create-process function of a parent process, a request to the default create-process function to execute code of an executable file in the second newly created process.

15. The method of claim 1, further comprising:
    receiving a second link artifact, wherein the second link artifact identifies a second executable file and includes one or more respective hash values computed from respective contents of one or more object files used to generate the second executable file;
    obtaining, from the static analysis system, one or more matching object artifacts, the one or more matching object artifacts being object artifacts that each include hash values that match the one or more hash values in the second link artifact; and designating source code of respective source code files identified by the one or more matching object artifacts as source code used to build the second executable file.

16. A system comprising:
one or more computers and one or more storage devices storing instructions that are operable, when executed by the one or more computers, to cause the one or more computers to perform operations comprising:
intercepting a first request to an operating system function, wherein the intercepted first request identifies a first executable to be executed in a first newly created process;
determining that the first executable identified by the intercepted first request is a compiler, the compiler being invoked to compile a source code file and generate an object file;
invoking the compiler to compile the source code file into the object file;
after the compiler exits, generating a first hash value of contents of the object file generated by the compiler;
generating an object artifact that identifies the source code file and includes the first hash value of contents of the object file generated by the compiler;
intercepting a second request to the operating system function, wherein the intercepted second request identifies a second executable to be executed in a second newly created process;
determining that the second executable identified by the intercepted second request is a linker, the linker being invoked to generate an executable file from one or more object files, including the object file;
generating a link artifact that includes respective hash values of each of the one or more object files used to generate the executable file; and
providing the link artifact and object artifact to a static analysis system that associates the executable file with source code used to build the executable file by matching hash values in the link artifact with hash values of the one or more object files and identifying source code in source code files identified by object artifacts associated with the one or more object files.

17. The system of claim 16, wherein the operations further comprise:
receiving a request to identify one or more attributes of source code used to build the executable file;
computing one or more attributes from source code associated with the executable file; and
providing the one or more computed attributes in response to the request.

18. The system of claim 17, wherein computing the one or more attributes from source code associated with the executable file comprises:
identifying the link artifact associated with the executable file;
identifying one or more object artifacts having one or more hash values matching respective hash values in the link artifact;
identifying one or more source code files identified by the one or more object artifacts; and
computing the one or more attributes from source code of the one or more source code files identified by the one or more object artifacts.

19. The system of claim 17, wherein the request is a request to identify one or more source code files used to build the executable file.

20. The system of claim 19, wherein the operations further comprise designating the one or more source code files as source code files used to build the executable file without comparing symbols in the executable file or in the respective source code files.

21. The system of claim 17, wherein the request is a request to identify source code that defines an externally linked symbol used in the executable file.

22. The system of claim 17, wherein the operations further comprise:
receiving a plurality of link artifacts generated from a build process; and
processing each particular link artifact of the plurality of link artifacts, including:
identifying one or more object artifacts having hash values matching hash values in the particular link artifact,
identifying one or more source code files used to build the executable file from the one or more object artifacts having hash values matching hash values in the particular link artifact, and
storing, in a database, an entry for the executable file, wherein the database associates the entry for the executable file with one or more attributes of source code from the identified one or more source code files,
wherein computing the one or more attributes from source code associated with the executable file comprises querying the database for source code associated with the executable file.

23. The system of claim 16, wherein a build system that launches the compiler or the linker deletes, renames, or moves one or more of the respective source code files or one or more of object files corresponding to the one or more object artifacts during a build process.

24. The system of claim 16, wherein the executable file does not include identifying information about the one or more object files used to build the executable file.

25. The system of claim 16, wherein the one or more object files do not include identifying information about the source code files used to generate the object files.

26. The system of claim 16, wherein determining that the second newly created process is a linker comprises intercepting a request to run the second newly created process.

27. The system of claim 16, wherein determining that the second newly created process is a linker comprises:
loading, by the second newly created process, a process interception library; and
determining, by library initialization code of the process interception library, that the second newly created process is a linker.

28. The system of claim 27, wherein the operations further comprise:
setting a shared library environment variable, wherein the shared library environment variable causes an operating system to load the process interception library into the second newly created process.

29. The system of claim 16, wherein intercepting the second request to the operating system function to execute a second executable in a second newly created process comprises intercepting, by a custom create-process function that overrides requests to a default create-process function of a parent process, a request to the default create-process function to execute code of an executable file in the second newly created process.

30. The system of claim 16, wherein the operations further comprise:
receiving a second link artifact, wherein the second link artifact identifies a second executable file and includes one or more respective hash values computed from respective contents of one or more object files used to generate the second executable file;

obtaining, from the static analysis system, one or more matching object artifacts, the one or more matching object artifacts being object artifacts that each include hash values that match the one or more hash values in the second link artifact; and designating source code of respective source code files identified by the one or more matching object artifacts as source code used to build the second executable file.

31. A computer program product, encoded on one or more non-transitory computer storage media, comprising instructions that when executed by one or more computers cause the one or more computers to perform operations comprising:

intercepting a first request to an operating system function, wherein the intercepted first request identifies a first executable to be executed in a first newly created process;

determining that the first executable identified by the intercepted first request is a compiler, the compiler being invoked to compile a source code file and generate an object file;

invoking the compiler to compile the source code file into the object file;

after the compiler exits, generating a first hash value of contents of the object file generated by the compiler;

generating an object artifact that identifies the source code file and includes the first hash value of contents of the object file generated by the compiler;

intercepting a second request to the operating system function, wherein the intercepted second request identifies a second executable to be executed in a second newly created process;

determining that the second executable identified by the intercepted second request is a linker, the linker being invoked to generate an executable file from one or more object files, including the object file;

generating a link artifact that includes respective hash values of each of the one or more object files used to generate the executable file; and providing the link artifact and object artifact to a static analysis system that associates the executable file with source code used to build the executable file by matching hash values in the link artifact with hash values of the one or more object files and identifying source code in source code files identified by object artifacts associated with the one or more object files.

32. The computer program product of claim 31, wherein the operations further comprise:

receiving a second link artifact, wherein the second link artifact identifies a second executable file and includes one or more respective hash values computed from respective contents of one or more object files used to generate the second executable file;

obtaining, from the static analysis system, one or more matching object artifacts, the one or more matching object artifacts being object artifacts that each include hash values that match the one or more hash values in the second link artifact; and designating source code of respective source code files identified by the one or more matching object artifacts as source code used to build the second executable file.

33. The computer program product of claim 31, wherein the operations further comprise:

receiving a request to identify one or more attributes of source code used to build the executable file;

computing one or more attributes from source code associated with the executable file; and providing the one or more computed attributes in response to the request.

34. The computer program product of claim 33, wherein computing the one or more attributes from source code associated with the executable file comprises:

identifying the link artifact associated with the executable file;

identifying one or more object artifacts having one or more hash values matching respective hash values in the link artifact;

identifying one or more source code files identified by the one or more object artifacts; and computing the one or more attributes from source code of the one or more source code files identified by the one or more object artifacts.

* * * * *